United States Patent
Iida et al.

(10) Patent No.: US 10,942,268 B2
(45) Date of Patent: Mar. 9, 2021

(54) MIMO RADAR DEVICE AND VEHICLE

(71) Applicant: SONY CORPORATION, Tokyo (JP)

(72) Inventors: Sachio Iida, Kanagawa (JP); Kenichi Kawasaki, Tokyo (JP); Kenichi Fujimaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 157 days.

(21) Appl. No.: 16/078,772

(22) PCT Filed: Apr. 7, 2017

(86) PCT No.: PCT/JP2017/014576
§ 371 (c)(1),
(2) Date: Aug. 22, 2018

(87) PCT Pub. No.: WO2017/179515
PCT Pub. Date: Oct. 19, 2017

(65) Prior Publication Data
US 2019/0049577 A1    Feb. 14, 2019

(30) Foreign Application Priority Data

Apr. 14, 2016 (JP) .............................. JP2016-081205

(51) Int. Cl.
*G01S 13/931* (2020.01)
*H01Q 21/28* (2006.01)
(Continued)

(52) U.S. Cl.
CPC ............ *G01S 13/931* (2013.01); *G01S 7/032* (2013.01); *G01S 13/42* (2013.01); *H01Q 1/3233* (2013.01);
(Continued)

(58) Field of Classification Search
None
See application file for complete search history.

(56) References Cited

U.S. PATENT DOCUMENTS

| 6,104,349 A * | 8/2000 | Cohen | H01Q 1/246 |
| | | | 343/702 |
| 7,015,869 B2 * | 3/2006 | Marlow | H01P 5/184 |
| | | | 174/266 |

(Continued)

FOREIGN PATENT DOCUMENTS

| DE | 202009003983 | 8/2009 |
| EP | 1837679 | 9/2007 |

(Continued)

OTHER PUBLICATIONS

International Search Report and Written Opinion prepared by the European Patent Office dated Jul. 5, 2017, for International Application No. PCT/JP2017/014576.

(Continued)

*Primary Examiner* — Bernarr E Gregory
(74) *Attorney, Agent, or Firm* — Sheridan Ross P.C.

(57) ABSTRACT

There is provided a MIMO radar device including: a first array antenna configured to have L (L≥2) antenna elements disposed in one direction under a first rule; and a second array antenna configured to have M (M≥2) antenna elements disposed in a same direction as the one direction of the first array antenna under a second rule, and to have at least two of the M antenna elements provided across the first array antenna.

13 Claims, 11 Drawing Sheets

(51) Int. Cl.
*G01S 13/42* (2006.01)
*H01Q 21/08* (2006.01)
*H01Q 5/42* (2015.01)
*G01S 7/03* (2006.01)
*H01Q 1/32* (2006.01)
*H01Q 21/00* (2006.01)
*G01S 13/00* (2006.01)

(52) U.S. Cl.
CPC ........... *H01Q 5/42* (2015.01); *H01Q 21/0025* (2013.01); *H01Q 21/08* (2013.01); *H01Q 21/28* (2013.01); *G01S 2013/93271* (2020.01); *G01S 2013/93272* (2020.01); *G01S 2013/93274* (2020.01); *G01S 2013/93275* (2020.01)

(56) References Cited

U.S. PATENT DOCUMENTS

| | | | |
|---|---|---|---|
| 2003/0134664 A1* | 7/2003 | Zancewicz | H01Q 3/26 455/562.1 |
| 2008/0030399 A1 | 2/2008 | Hoshibumi et al. | |
| 2008/0303711 A1 | 12/2008 | Katsuji | |
| 2008/0316127 A1* | 12/2008 | Pawlak | H01Q 3/24 343/724 |
| 2014/0066757 A1 | 3/2014 | Naftali | |
| 2014/0266902 A1 | 9/2014 | Telesphor et al. | |
| 2015/0048965 A1* | 2/2015 | Cornic | G01S 13/02 342/27 |
| 2016/0308287 A1 | 10/2016 | Telesphor et al. | |

FOREIGN PATENT DOCUMENTS

| | | |
|---|---|---|
| EP | 2779308 | 9/2014 |
| JP | 2007-286033 | 11/2007 |
| JP | 2008-304417 | 12/2008 |
| JP | 2012-068224 | 4/2012 |
| JP | 2014-173940 | 9/2014 |
| JP | 2014-179985 | 9/2014 |
| JP | 2014-529076 | 10/2014 |
| JP | 2015-532811 | 11/2015 |
| WO | WO 2013/034282 | 3/2013 |

OTHER PUBLICATIONS

Tamune, "Flexibility of One Person and Array," 2014 IECE General Conference, Mar. 18, 2014, p. 49.

Official Action (no English translation available) for Japanese Patent Application No. 2016-081205, dated May 12, 2020, 7 pages.

* cited by examiner

MIMO RADAR DEVICE AND VEHICLE

CROSS REFERENCE TO RELATED APPLICATIONS

This application is a national stage application under 35 U.S.C. 371 and claims the benefit of PCT Application No. PCT/JP2017/014576 having an international filing date of 7 Apr. 2017, which designated the United States, which PCT application claimed the benefit of Japanese Priority Patent Application JP 2016-081205 filed Apr. 14, 2016, the entire contents of each of which are incorporated herein by reference.

TECHNICAL FIELD

The present disclosure relates to a MIMO radar device and a vehicle.

BACKGROUND ART

Systems have recently been made practical each of which installs a plurality of radar devices in an automobile to sense the surrounding situations, thereby assisting the automobile in safe driving. Such a radar device has to have high azimuth resolution, and concurrently to be small and low in price.

There is a technique of distributing a small number of antenna elements to predetermined positions with the nested-array technology to lessen costs, and performing predetermined signal processing on signals received by those antenna elements to generate data received by a virtual array antenna including a large number of elements (see PTL 1).

There is also a signal processing technique for multiple-input multiple-output (MIMO) radars. The signal processing technique transmits radio waves with an array antenna including M elements, and receiving the radio waves with an array antenna including L elements for miniaturization, thereby generating data received by a virtual array antenna including L×M elements (see PTL 2).

CITATION LIST

Patent Literature

[PTL 1]
JP 2014-173940A
[PTL 2]
JP 2012-68224A

SUMMARY

Technical Problem

Even small radar devices including an increased number of antenna elements by the nested-array technology and the MIMO technology still have not been small or low in price sufficiently for installation in automobiles.

An embodiment of the present disclosure then proposes a novel and improved MIMO radar device that can achieve high azimuth resolution with a still smaller number of antenna elements than those of the combination of the nested-array technology with the MIMO technology, and a vehicle including the MIMO radar device.

Solution to Problem

According to an embodiment of the present disclosure, there is provided a MIMO radar device including: a first array antenna configured to have L (L≥2) antenna elements disposed in one direction under a first rule; and a second array antenna configured to have M (M≥2) antenna elements disposed in a same direction as the one direction of the first array antenna under a second rule, and to have at least two of the M antenna elements provided across the first array antenna.

According to another embodiment of the present disclosure, there is provided a MIMO radar device including: a signal processing device including, on one side, antenna terminals of L (L≥2) antenna elements included in a first array antenna, and, on both sides orthogonal to the one side, antenna terminals of M (M≥2) antenna elements included in a second array antenna.

According to still another embodiment of the present disclosure, there is provided a vehicle including: the above MIMO radar device.

Advantageous Effects of Invention

According to an embodiment of the present disclosure as described above, it is possible to provide a novel and improved radar device that can achieve high azimuth resolution with a still smaller number of antenna elements than those of the combination of the nested-array technology with the MIMO technology, and a vehicle including the radar device.

Note that the effects described above are not necessarily limitative. With or in the place of the above effects, there may be achieved any one of the effects described in this specification or other effects that may be grasped from this specification.

DESCRIPTION OF EMBODIMENTS

Figure 1:
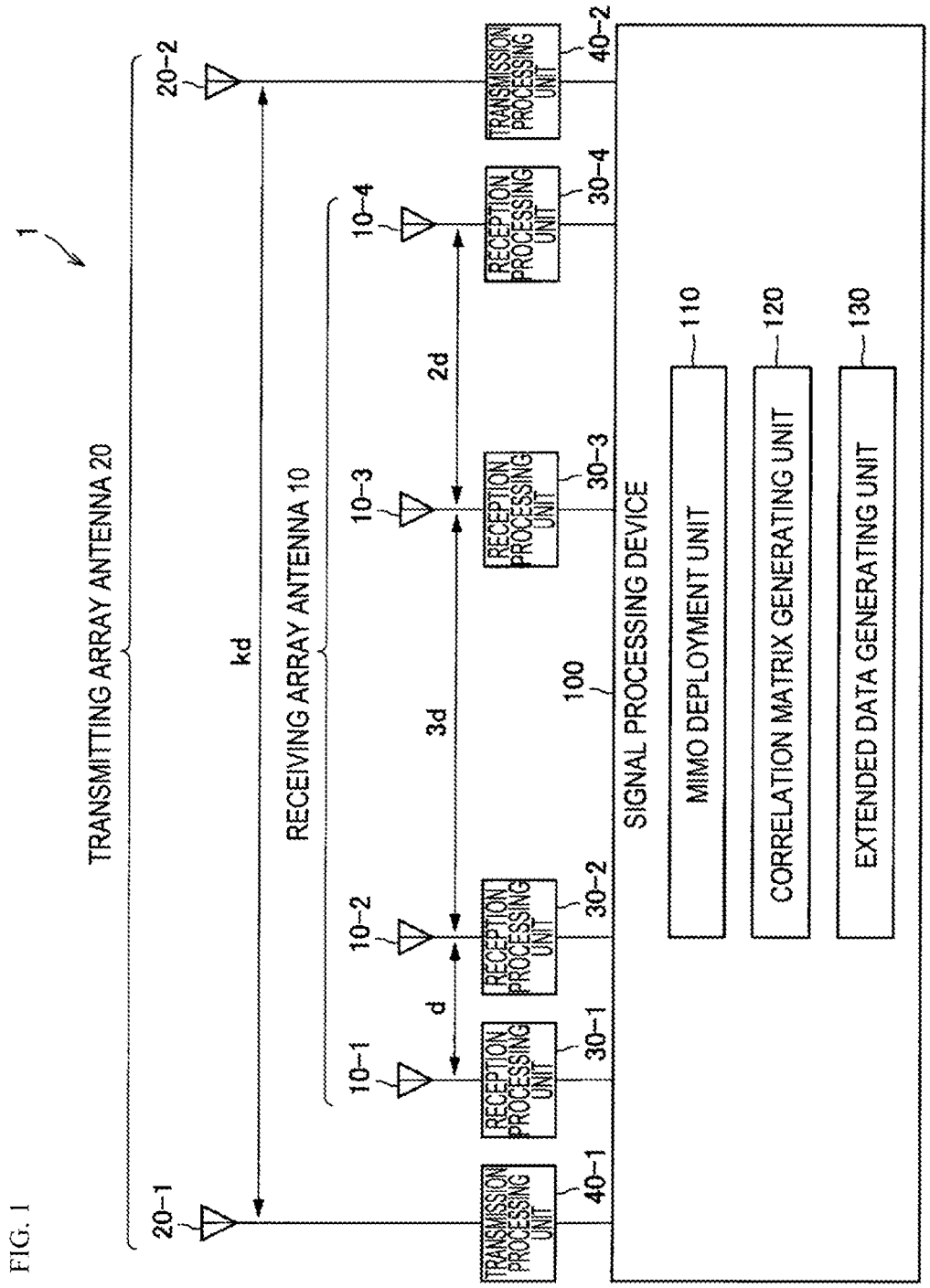
FIG. 1 is an explanatory diagram illustrating a configuration example of a MIMO radar device 1 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be now made in the following order.
1. Embodiment of the Present Disclosure
 1.1. Configuration Example of MIMO Radar Device
 1.2. Operation Example of MIMO Radar Device
 1.3. Modification of MIMO Radar Device
2. Conclusion 1. Embodiment of the Present Disclosure (1.1. Configuration Example of MIMO Radar Device)

First of all, a configuration example of a MIMO radar device according to an embodiment of the present disclosure will be described with reference to the drawings.

FIG. 1 is an explanatory diagram illustrating a configuration example of a MIMO radar device 1 according to an embodiment of the present disclosure. The following describes the configuration example of the MIMO radar device 1 according to an embodiment of the present disclosure with reference to FIG. 1.

As illustrated in FIG. 1, the MIMO radar device 1 according to an embodiment of the present disclosure includes a receiving array antenna 10, a transmitting array antenna 20, and a signal processing device 100.

The receiving array antenna 10 is an array antenna including L (L≥2) receiving antenna elements. The receiving array antenna 10 illustrated in FIG. 1 has the shortest distance as d, and the number L of elements is equal to 4. The elements are linearly disposed in the arrangement method of a perfect Golomb ruler. That is, the receiving array antenna 10 illustrated in FIG. 1 includes the four antenna elements of receiving antenna elements 10-1 to 10-4 disposed in one direction. The receiving array antenna 10 further includes reception processing units 30-1 to 30-4 respectively corresponding to the receiving antenna elements 10-1 to 10-4.

A Golomb ruler has marks disposed at a set of integer positions on an imaginary ruler in a manner that no pairs of marks are the same distance apart. A perfect Golomb ruler has marks disposed in a manner that all distances up to the overall length of this imaginary ruler can be measured.

Figure 2:
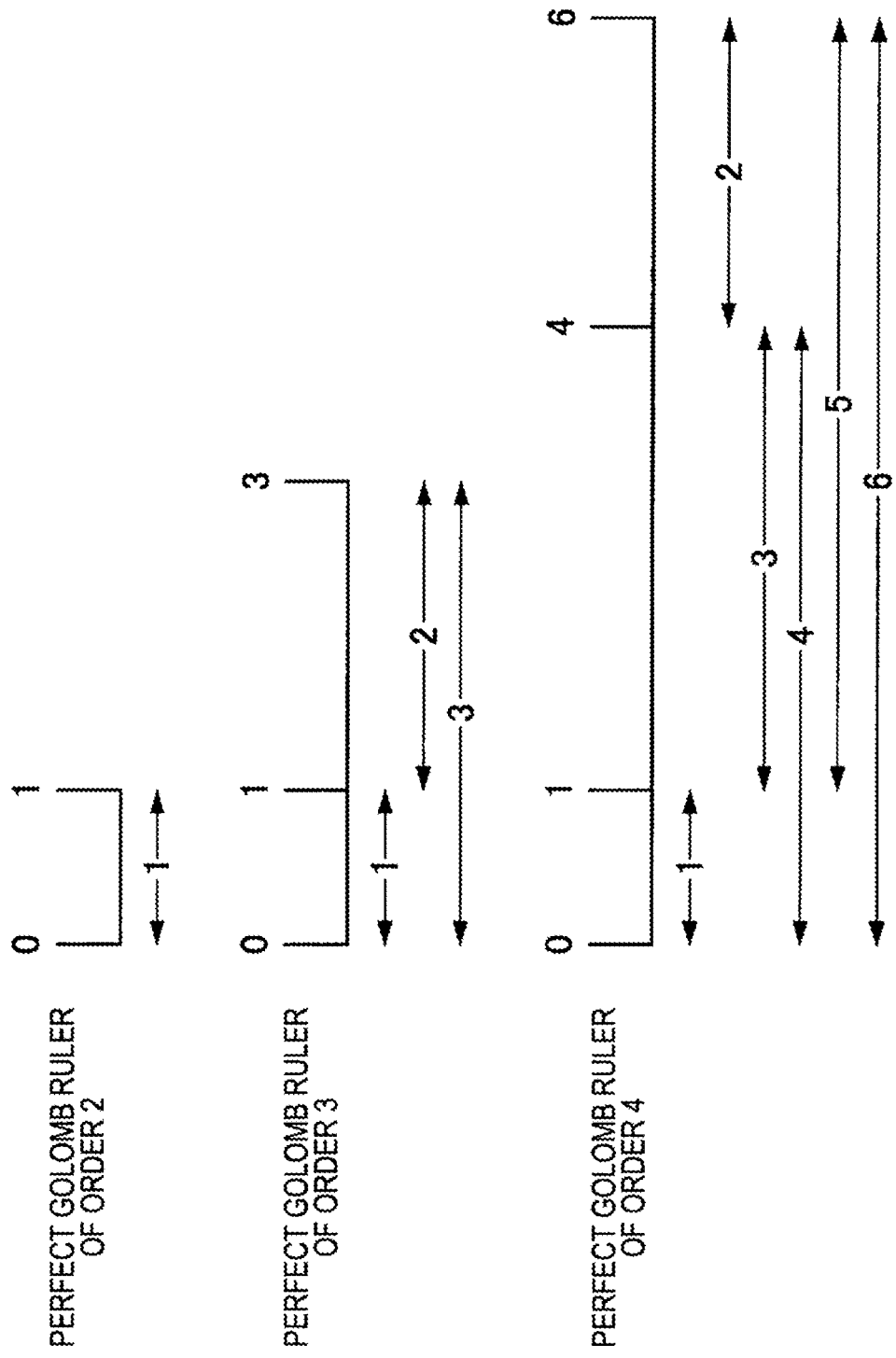
FIG. 2 is an explanatory diagram illustrating a perfect Golomb ruler.

FIG. 2 is an explanatory diagram illustrating a perfect Golomb ruler. As illustrated in FIG. 2, a perfect Golomb ruler has three types of arrangement method. A perfect Golomb ruler of order 2 has a scale of (0, 1), a perfect Golomb ruler of order 3 has a scale of (0, 1, 3), and a perfect Golomb ruler of order 4 has a scale of (0, 1, 4, 6). Needless to say, it is possible to measure distances up to the overall length (=1) by disposing marks at the positions of 0 and 1 in the case of order 2. In the case of order 3, it is possible to measure the distances of 1, 2, and 3, or all distances up to the overall length (=3) as illustrated in FIG. 2 by disposing marks at the positions of 0, 1, and 3. In the case of order 4, it is possible to measure the distances of 1 to 6 or all distances up to the overall length (=6) as illustrated in FIG. 2 by disposing marks at the positions of 0, 1, 4, and 6.

In the present embodiment, the distance between the receiving antenna elements 10-1 and 10-2 is set as d, the distance between the receiving antenna elements 10-2 and 10-3 is set as 3d, and the distance between the receiving antenna elements 10-3 and 10-4 is set as 2d. That is, it means that the receiving antenna elements 10-1 to 10-4 are linearly disposed in the arrangement method of a perfect Golomb ruler.

The transmitting array antenna 20 is an array antenna including M (M≥2) transmitting antenna elements. The transmitting array antenna 20 has the shortest distance as kd, which is greater than the overall width of the receiving array antenna 10, and the number M of elements is equal to 2. The elements are linearly disposed. That is, the transmitting array antenna 20 illustrated in FIG. 1 includes the two of transmitting antenna elements 20-1 and 20-2 disposed in the same direction as the direction of the receiving antenna elements 10-1 to 10-4 of the receiving array antenna 10. The transmitting array antenna 20 further includes transmission processing units 40-1 and 40-2 respectively corresponding to the transmitting antenna elements 20-1 and 20-2. Here, the maximum value of a coefficient k is related to the number L of elements and the arrangement method of the receiving array antenna 10. The upper limit of the maximum value is defined in the following expression 1 as a condition for arranging equidistant antenna elements after array extension processing described below.

[Math. 1]

$$k \leq L(L-1)+1 \quad \text{(expression 1)}$$

Since L=4 in FIG. 1, k has a maximum value of 13. The present embodiment assumes k=8.

The transmitting array antenna 20 transmits, from each transmitting antenna element, radar signals that are generated by the transmission processing units 40-1 and 40-2, and are orthogonal for each transmitting antenna element. The receiving array antenna 10 receives the radar echo signals that are the radar signals transmitted from the transmitting array antenna 20 and reflected back by a target, and outputs the received radar echo signals to the reception processing units 30-1, 30-2, 30-3, and 30-4. Orthogonal means that differences in time, frequencies, and signs do not cause mutual interference. This characteristic makes it possible to separate radar echo signals into the components derived from the respective transmitting antenna elements. The reception processing units 30-1, 30-2, 30-3, and 30-4 perform reception processing such as amplification, frequency conversion, and frequency filtering on the received radar echo signals, and output digital signals subjected to analog-digital conversion to the signal processing device 100.

The signal processing device 100 includes a MIMO deployment unit 110, a correlation matrix generating unit 120, and an extended data generating unit 130.

The MIMO deployment unit 110 separates the digital signals input from the reception processing units 30-1 to 30-4 into the components derived from the transmitting antenna elements 20-1 and 20-2, by using the orthogonality of the radar signals, and then arranges the digital signals for each of the combinations of the transmitting antenna elements 20-1 and 20-2 with the receiving antenna elements 10-1 to 10-4 to generate L×M received signal vectors x that have been subjected to MIMO deployment. Specifically, the MIMO deployment unit 110 rearranges the digital signals in the order of the echo signals transmitted from the transmitting antenna element 20-1 and received by the receiving antenna elements 10-1 to 10-4, and the echo signals transmitted from the transmitting antenna element 20-2 and received by the receiving antenna elements 10-1 to 10-4. The MIMO deployment unit 110 outputs the generated received signal vectors x to the correlation matrix generating unit 120.

The mode vector of the transmitting array antenna 20 is shown in an expression 2, while the mode vector of the receiving array antenna 10 is shown in an expression 3. In the following expressions, T means transposition.

[Math. 2]

$$a_{TX} = [1 \ e^{+3j\phi}]^T \quad \text{(expression 2)}$$

[Math. 3]

$$a_{RX} = [1 \ e^{+1j\phi} \ e^{+4j\phi} \ e^{+6j\phi}]^T \quad \text{(expression 3)}$$

$\phi$ in the expressions 2 and 3 has the value decided on the basis of the shortest distance d of the receiving array antenna 10, the wavelength λ of the radar signals, and the radar echo signals' angle θ of arrival as shown in an expression 4.

[Math. 4]

$$\varphi = \frac{2\pi}{\lambda} d \sin(\theta) \quad \text{(expression 4)}$$

Typically, d is set at approximately 0.5 wavelengths, on which space is sampled twice a wavelength, to suppress the generation of a grating lobe.

The received signal vector x subjected to MIMO deployment in the MIMO deployment unit 110 is the product of a plane wave echo signal s that is a radar signal reflected back by a target, and a mode vector $a_{MIMO}$ as shown in the following expression 5.

[Math. 5]

$$x = s \cdot a_{MIMO} \quad \text{(expression 5)}$$

Here, the mode vector $a_{MIMO}$ is the Kronecker product of the mode vectors of the transmitting array antenna 20 and the receiving array antenna 10 as shown in the following expression 6.

[Math. 6]

$$a_{MIMO} = a_{TX} \otimes a_{RX} = [1 \ e^{+1j\phi} \ e^{+4j\phi} \ e^{+6j\phi} \ e^{+8j\phi} \ e^{+9j\phi} \ e^{+12j\phi} \ e^{+14j\phi}]^T \quad \text{(expression 6)}$$

The correlation matrix generating unit 120 generates a correlation matrix $R_{XX}$ shown in an expression 7 from the received signal vectors x generated by the MIMO deployment unit 110. The correlation matrix $R_{XX}$ has a size of (L×M)×(L×M). H means conjugate transposition. The correlation matrix generating unit 120 sends the generated correlation matrix $R_{XX}$ to the extended data generating unit 130.

[Math. 7]

$$R_{XX} = xx^H = |s|^2 \cdot \begin{bmatrix} 1 & e^{-1j\varphi} & e^{-4j\varphi} & e^{-6j\varphi} & e^{-8j\varphi} & e^{-9j\varphi} & e^{-12j\varphi} & e^{-14j\varphi} \\ e^{+1j\varphi} & 1 & e^{-3j\varphi} & e^{-5j\varphi} & e^{-7j\varphi} & e^{-8j\varphi} & e^{-11j\varphi} & e^{-13j\varphi} \\ e^{+4j\varphi} & e^{+3j\varphi} & 1 & e^{-2j\varphi} & e^{-4j\varphi} & e^{-5j\varphi} & e^{-8j\varphi} & e^{-10j\varphi} \\ e^{+6j\varphi} & e^{+5j\varphi} & e^{+2j\varphi} & 1 & e^{-2j\varphi} & e^{-3j\varphi} & e^{-6j\varphi} & e^{-8j\varphi} \\ e^{+8j\varphi} & e^{+7j\varphi} & e^{+4j\varphi} & e^{+2j\varphi} & 1 & e^{-1j\varphi} & e^{-4j\varphi} & e^{-6j\varphi} \\ e^{+9j\varphi} & e^{+8j\varphi} & e^{+5j\varphi} & e^{+3j\varphi} & e^{+1j\varphi} & 1 & e^{-3j\varphi} & e^{-5j\varphi} \\ e^{+12j\varphi} & e^{+11j\varphi} & e^{+8j\varphi} & e^{+5j\varphi} & e^{+4j\varphi} & e^{+3j\varphi} & 1 & e^{-2j\varphi} \\ e^{+14j\varphi} & e^{+13j\varphi} & e^{+10j\varphi} & e^{+8j\varphi} & e^{+6j\varphi} & e^{+5j\varphi} & e^{+2j\varphi} & 1 \end{bmatrix}$$ (expression 7)

The correlation matrix $R_{XX}$ shown in the expression 7 clearly has all of 29 types of phase continuously from $e^{-14j\psi}$ to $e^{+14j\psi}$. This continuity is guaranteed by the condition of 2 shown in the expression 1. At the risk of repetition, the maximum value of the coefficient k is limited by the number L of elements and the arrangement method of the receiving array antenna 10. The receiving array antenna 10 includes four elements and uses a perfect Golomb ruler in the present embodiment. Accordingly, if the maximum value is less than or equal to 13, the continuity of the phases of the correlation matrix can be secured. Incidentally, if k=13, the correlation matrix has all of 39 types of phase continuously from $e^{-19j\psi}$ to $e^{+19j\psi}$.

The extended data generating unit 130 performs array extension processing of mapping the elements of the correlation matrix $R_{XX}$ generated by the correlation matrix generating unit 120 to an extended data vector y shown in an expression 8.

[Math. 8]

$$y = |s|^2 \cdot a_{EX}$$ (expression 8)

The mode vector $a_{EX}$ of the extended data vector y is a column vector having a length $L(L-1)+kM(M-1)+1$. The mode vector $a_{EX}$ has the continuous elements from $e^{-14j\psi}$ to $e^{+14j\psi}$ arranged as shown in an expression 9.

[Math. 9]

$$a_{EX} = \begin{bmatrix} e^{-14j\varphi} \\ e^{-13j\varphi} \\ e^{-12j\varphi} \\ e^{-11j\varphi} \\ e^{-10j\varphi} \\ e^{-9j\varphi} \\ e^{-8j\varphi} \\ e^{-7j\varphi} \\ e^{-6j\varphi} \\ e^{-5j\varphi} \\ e^{-4j\varphi} \\ e^{-3j\varphi} \\ e^{-2j\varphi} \\ e^{-1j\varphi} \\ 1 \\ e^{+1j\varphi} \\ e^{+2j\varphi} \\ e^{+3j\varphi} \\ e^{+4j\varphi} \\ e^{+5j\varphi} \\ e^{+6j\varphi} \\ e^{+7j\varphi} \\ e^{+8j\varphi} \\ e^{+9j\varphi} \\ e^{+10j\varphi} \\ e^{+11j\varphi} \\ e^{+12j\varphi} \\ e^{+13j\varphi} \\ e^{+14j\varphi} \end{bmatrix}$$ (expression 9)

Figure 3:
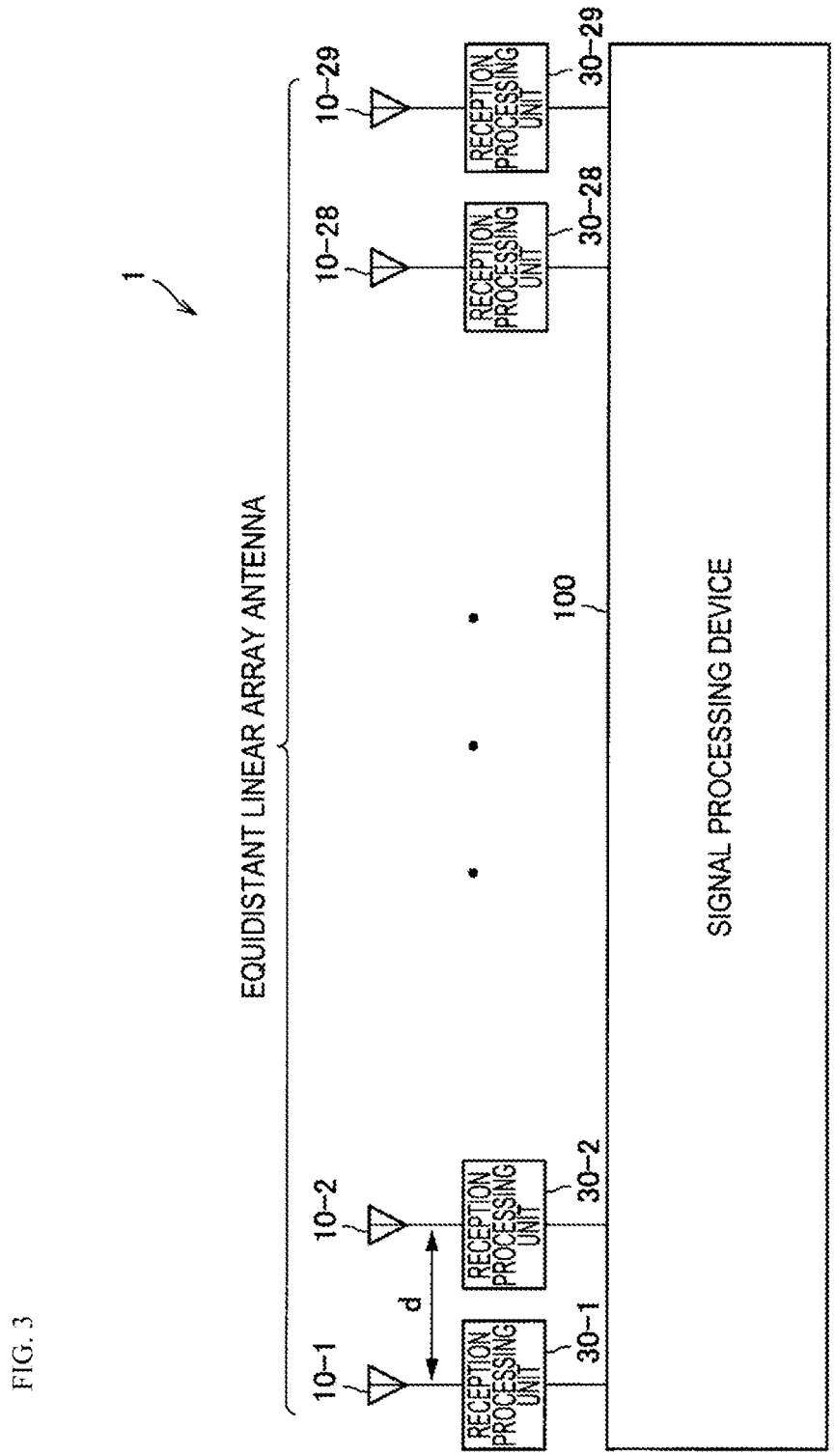
FIG. 3 is an explanatory diagram illustrating a radar device including an equidistant linear array antenna including 29 antenna elements.

Since L=4, M=2, and k=8 in the present embodiment, the mode vector $a_{EX}$ of the extended data vector is similar to the mode vector of an equidistant linear array antenna including 29 elements. The MIMO radar device 1 according to the present embodiment is thus equivalent to a radar device including an equidistant linear array antenna including as many as 29 elements as illustrated in FIG. 3.

The extended data generating unit 130 maps the correlation matrix $R_{XX}$ to the extended data vector y by performing an operation of averaging elements having the same phase, vectorizing $R_{XX}$, and then multiplying $R_{XX}$ by a transformation matrix U from the left as shown in an expression 10. vec means vertically arranging and vectorizing the column vectors of a matrix.

[Math. 10]

$$y = U \cdot \text{vec}(R_{XX}) \quad \text{(expression 10)}$$

In the present embodiment, the extended data vector y has 29 rows, and vec(Rxx) has 64 rows. The transformation matrix U is then a matrix having a size of 29×64 as shown in an expression 11.

[Math. 11]

$$U = \begin{bmatrix}
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 1/2 & 0 & 0 & 0 & 0 & 0 & 0 & 0 \\
1/8 & 0 & 0 & 0 & 0 & 0 & 0 & 0 & 0 & 1/8 & 0 & 0 & 0 & 0 & 0 & 0 \\
0 & 1/2 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 1/3 & 0 & 0 & 0 & 0 & 0 \\
0 & 0 & 1/3 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 1/3 & 0 & 0 & 0 & 0 \\
0 & 0 & 0 & 1/3 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 1 & 0 & 0 & 0 \\
0 & 0 & 0 & 0 & 1/4 & 0 & 0 & 0 & 0 & 0 & 0 & 0 & 0 & 1/4 & 0 & 0 \\
0 & 0 & 0 & 0 & 0 & 1 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 1 & 0 \\
0 & 0 & 0 & 0 & 0 & 0 & 1 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 1 \\
0 & 0 & 0 & 0 & 0 & 0 & 0 & 1 & 0 & 0 & 0 & 0 & 0 & 0 & 0 & 0
\end{bmatrix} \quad \text{(expression 11)}$$

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1/3 | 0 | 0 | 0 | 0 | 0 | 0 | 0 |
| 0 | 0 | 0 | 0 | 0 | 0 | 0 | 0 | 0 | 1/3 | 0 | 0 | 0 | 0 | 0 | 0 |
| 1/3 | 0 | 0 | 0 | 0 | 0 | 0 | 0 | 0 | 0 | 0 | 0 | 0 | 0 | 0 | 0 |
| 0 | 1/3 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1/3 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 1/3 | 0 | 0 | 0 | 0 | 0 | 0 | 0 | 0 | 1/8 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 1/3 | 0 | 0 | 0 | 0 | 0 | 0 | 0 | 1/3 | 0 | 0 | 0 | 0 |
| 0 | 0 | 0 | 0 | 0 | 0 | 0 | 0 | 0 | 0 | 0 | 0 | 1/3 | 0 | 0 | 0 |
| 0 | 0 | 0 | 0 | 1/3 | 0 | 0 | 0 | 0 | 0 | 0 | 0 | 0 | 0 | 0 | 0 |
| 0 | 0 | 0 | 0 | 0 | 1/3 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 1/3 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1/4 | 0 | 0 | 0 | 0 | 0 | 0 | 0 | 1/4 | 0 |
| 0 | 0 | 0 | 0 | 0 | 0 | 0 | 0 | 0 | 0 | 0 | 0 | 0 | 0 | 0 | 1/4 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

-continued

| | | | | | | | | | | | | | | | |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |
| 1/4 | 0 | 0 | 0 | 0 | 0 | 0 | 0 | 1/4 | 0 | 0 | 0 | 0 | 0 | 0 | 0 |
| 0 | 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 1/3 | 0 | 0 | 0 | 0 | 0 |
| 0 | 0 | 1/3 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 1/3 | 0 | 0 | 0 | 0 |
| 0 | 0 | 0 | 1/3 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 1/2 | 0 | 0 | 0 |
| 0 | 0 | 0 | 0 | 1/3 | 0 | 0 | 0 | 0 | 0 | 0 | 0 | 0 | 1/8 | 0 | 0 |
| 0 | 0 | 0 | 0 | 0 | 1/2 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 1/2 | 0 |
| 0 | 0 | 0 | 0 | 0 | 0 | 1/3 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 1/3 |
| 0 | 0 | 0 | 0 | 0 | 0 | 0 | 1/3 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

-continued $$\begin{bmatrix}
0 & 0 & 0 & 0 & 0 & 0 & 0 & 0 & 1 & 0 & 0 & 0 & 0 & 0 & 0 & 0 \\
0 & 0 & 0 & 0 & 0 & 0 & 0 & 0 & 0 & 1 & 0 & 0 & 0 & 0 & 0 & 0 \\
1 & 0 & 0 & 0 & 0 & 0 & 0 & 0 & 0 & 0 & 0 & 0 & 0 & 0 & 0 & 0 \\
0 & 1 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 1/4 & 0 & 0 & 0 & 0 & 0 & 0 & 0 & 0 & 1/4 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 1/3 & 0 & 0 & 0 & 0 & 0 & 0 & 0 & 0 & 1/3 & 0 & 0 & 0 \\
0 & 0 & 0 & 0 & 0 & 0 & 0 & 0 & 0 & 0 & 0 & 0 & 0 & 1/3 & 0 & 0 \\
0 & 0 & 0 & 0 & 1/3 & 0 & 0 & 0 & 0 & 0 & 0 & 0 & 0 & 0 & 0 & 0 \\
0 & 0 & 0 & 0 & 0 & 1/3 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 1/3 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 1/8 & 0 & 0 & 0 & 0 & 0 & 0 & 0 & 0 & 1/8 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 1/3 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0
\end{bmatrix}$$

As a substrate for implementing the MIMO radar device 1, a substrate such as a polytetrafluoroethylene (PTFE) board having a preferable high frequency characteristic can be used. If, for example, a PTFE board is used as a substrate of the MIMO radar device 1, it is possible to make the size of the board smaller and to reduce the manufacturing cost.

The MIMO radar device 1 according to an embodiment of the present disclosure is configured in this way, and then has, in spite of a small number of antenna elements, the equivalent configuration to the configuration of a MIMO radar device including a large number of antenna elements. The MIMO radar device 1 according to an embodiment of the present disclosure is configured in this way, and can then achieve high azimuth resolution in spite of a small number of antenna elements.

The configuration example of the MIMO radar device 1 according to an embodiment of the present disclosure has been described so far. Next, an operation example of the MIMO radar device 1 according to an embodiment of the present disclosure will be described.

(1.2. Operation Example of MIMO Radar Device)

Figure 4:
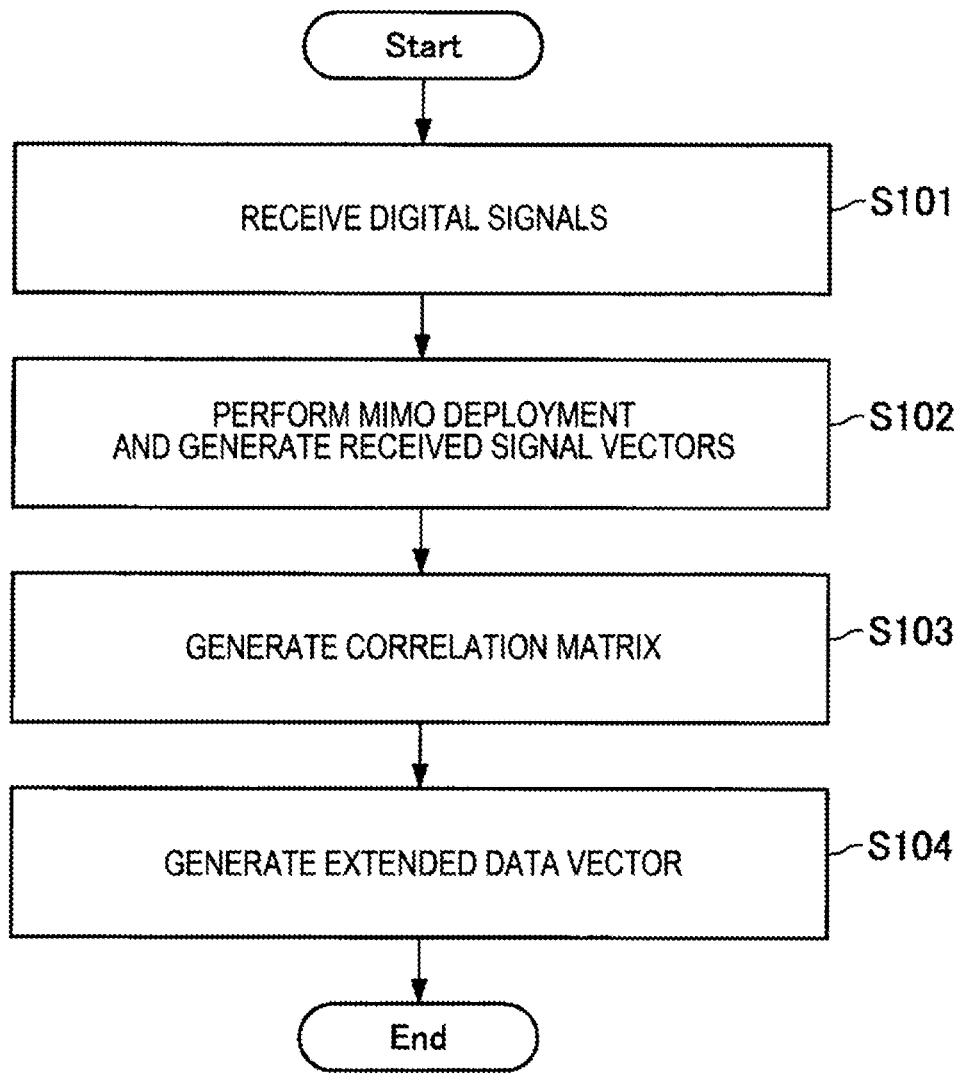
FIG. 4 is a flowchart describing an operation example of the MIMO radar device 1 according to an embodiment of the present disclosure.

FIG. 4 is a flowchart describing an operation example of the MIMO radar device 1 according to an embodiment of the present disclosure. FIG. 4 illustrates an operation example of a signal processing device 100 included in the MIMO radar device 1 according to an embodiment of the present disclosure. The following describes the operation example of the MIMO radar device 1 according to an embodiment of the present disclosure with reference to FIG. 4.

The MIMO radar device 1 transmits, from each transmitting antenna element of the transmitting array antenna 20, radar signals that are orthogonal for each transmitting antenna element of the transmitting array antenna 20. The MIMO radar device 1 then uses the receiving array antenna 10 to receive the radar echo signals that are the radar signals transmitted from the transmitting array antenna 20 and reflected back by a target.

The receiving array antenna 10 outputs the received radar echo signals to the reception processing units 30-1, 30-2, 30-3, and 30-4. The reception processing units 30-1, 30-2, 30-3, and 30-4 perform reception processing such as amplification, frequency conversion, and frequency filtering on the received radar echo signals, and output digital signals subjected to analog-digital conversion to the signal processing device 100. The signal processing device 100 receives the digital signals output from the reception processing units 30-1, 30-2, 30-3, and 30-4 (step S101).

Next, the signal processing device 100 performs MIMO deployment to rearrange the received digital signals for each of the combinations of the transmitting antenna elements 20-1 and 20-2 with the receiving antenna elements 10-1, 10-2, 10-3, and 10-4 as described above, and generates received signal vectors (step S102). The process in step S102 is executed, for example, by the MIMO deployment unit 110.

Next, the signal processing device 100 generates a correlation matrix from the received signal vectors as described above (step S103). The process in step S103 is executed, for example, by the correlation matrix generating unit 120.

The signal processing device 100 then generates an extended data vector from the generated correlation matrix as described above (step S104). The process in step S104 is executed, for example, by the extended data generating unit 130.

The MIMO radar device 1 according to an embodiment of the present disclosure operates in this way, and can thus achieve high azimuth resolution in spite of a small number of antenna elements.

The MIMO radar device 1 according to an embodiment of the present disclosure disposes each antenna element of the receiving array antenna 10 in the arrangement method of a perfect Golomb ruler, has the shortest distance between antenna elements of the transmitting array antenna 20 greater than the overall width of the receiving array antenna 10, and limits the maximum value of the shortest distance with the expression 1. This prevents the MIMO radar device 1 according to an embodiment of the present disclosure from physically increasing in size, and allows the MIMO radar device 1 according to an embodiment of the present disclosure to generate an extended data vector equivalently to a radar device including an equidistant linear array antenna including a large number of elements. The MIMO radar device 1 according to an embodiment of the present disclosure can thus achieve miniaturization and concurrently high azimuth resolution.

It has been described in the present embodiment that the number L of receiving antenna elements of the receiving array antenna 10 is equal to 4, the receiving antenna elements are disposed with a perfect Golomb ruler, the number M of transmitting antenna elements of the transmitting array antenna 20 is equal to 2, and the transmitting antenna elements are linearly disposed. The present disclosure is not, however, limited to such an example. For example, the transmitting antenna elements of the transmitting array antenna 20 may also be disposed with a perfect Golomb ruler. The number L of receiving antenna elements and the number M of transmitting antenna elements can have any combination of natural numbers from 2 to 4. L is not necessarily greater than M, but M may be greater than L, or equal to L.

Figure 5:
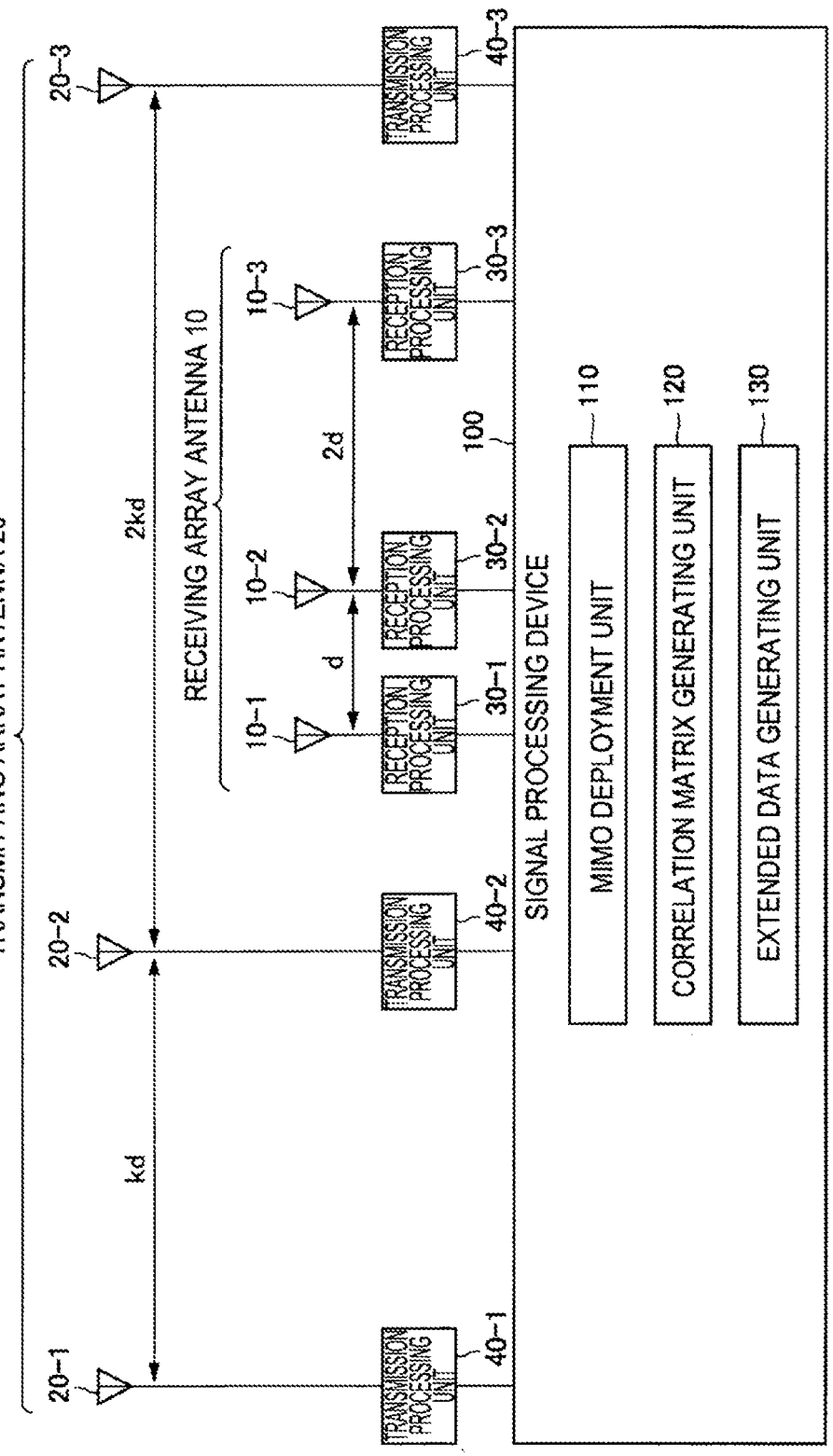
FIG. 5 is an explanatory diagram illustrating another configuration example of the MIMO radar device 1 according to an embodiment of the present disclosure.

FIG. 5 is a explanatory diagram illustrating another configuration example of the MIMO radar device 1 according to an embodiment of the present disclosure. FIG. illustrates a configuration example of the MIMO radar device 1 with the number of transmitting antenna elements of the transmitting array antenna 20 equal to the number of receiving antenna elements of the receiving array antenna 10 (three transmitting antenna elements and three receiving antenna elements).

The transmitting antenna elements of the transmitting array antenna 20 and the receiving antenna elements of the receiving array antenna 10 are both disposed in the arrangement method of a perfect Golomb ruler. If the number of transmitting antenna elements of the transmitting array antenna 20 is equal to the number of receiving antenna elements of the receiving array antenna 10, disposing, for example, the receiving antenna elements 10-1 to 10-3 and the transmitting antenna element 20-1 to 20-3 as illustrated in FIG. 5 makes it possible to achieve miniaturization and high azimuth resolution.

A MIMO radar large scale integration (LSI) (large-scale integrated circuit) used by the MIMO radar device 1 according to an embodiment of the present disclosure may have terminal disposition in which a receiving antenna terminal is disposed on one side, and transmitting antenna terminals are disposed on both sides thereof to facilitate the receiving antenna elements 10-1 to 10-4 to be disposed between the transmitting antenna elements 20-1 and 20-2.

Figure 6:
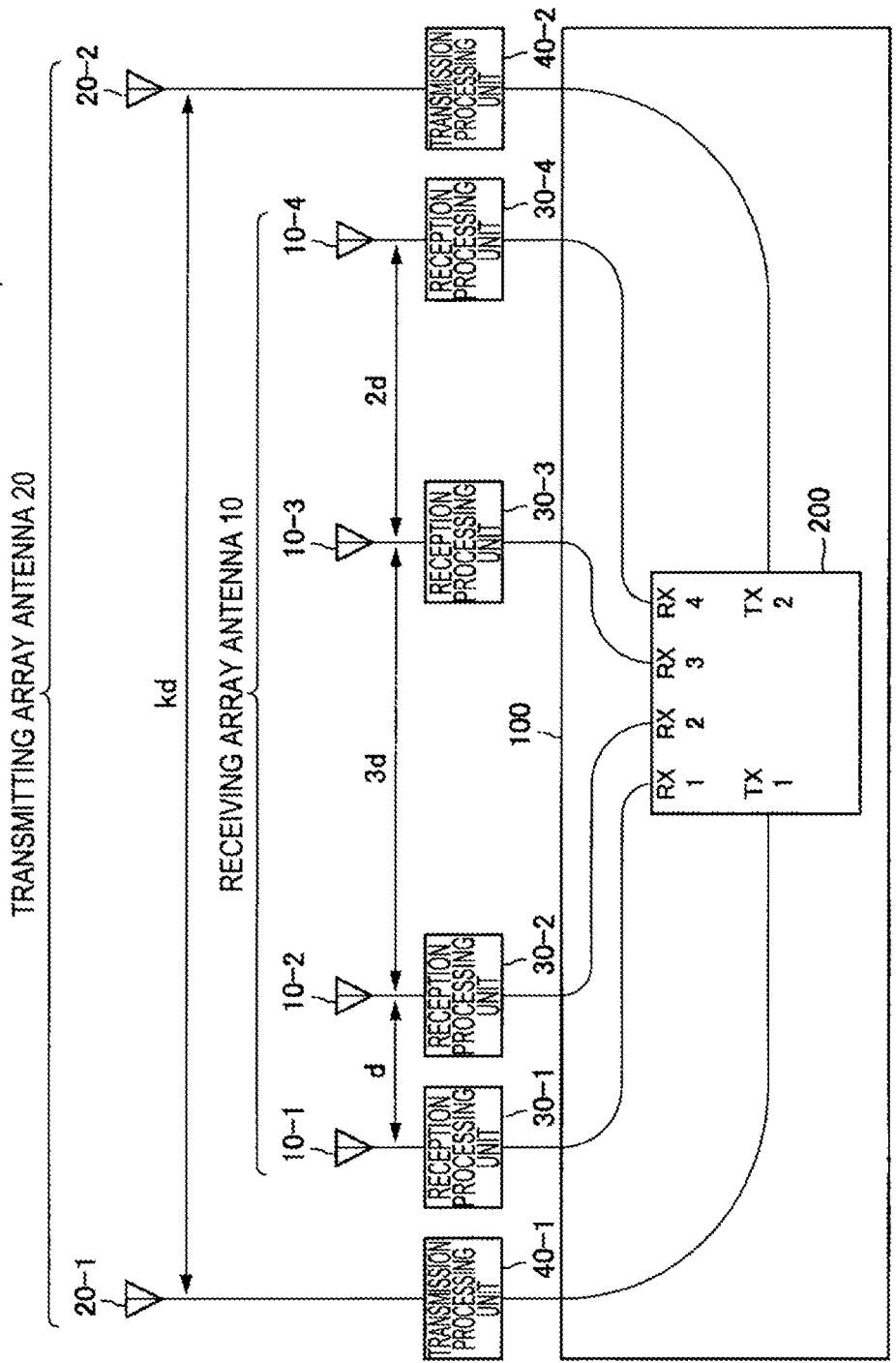
FIG. 6 is an explanatory diagram illustrating a configuration example of the MIMO radar device 1 according to an embodiment of the present disclosure.

FIG. 6 is an explanatory diagram illustrating a configuration example of the MIMO radar device 1 according to an embodiment of the present disclosure. FIG. 6 illustrates that a MIMO radar LSI 200 is installed in the signal processing device 100.

The MIMO radar LSI 200 may have terminal disposition as illustrated in FIG. 6 in which receiving antenna terminals RX1 to RX4 are disposed on one side, and transmitting antenna terminals TX1 and TX2 are disposed on both orthogonal sides. The MIMO radar LSI 200 has this terminal disposition, thereby facilitating the MIMO radar device 1 according to an embodiment of the present disclosure to dispose the receiving antenna elements 10-1 to 10-4 between the transmitting antenna elements 20-1 and 20-2.

(1.3. Modification of MIMO Radar Device)

Next, a modification of the MIMO radar device 1 according to an embodiment of the present disclosure will be described.

It has been described in the above-described example that the inside array antenna is linearly disposed at distances of a perfect Golomb ruler. The present disclosure is not, however, limited to such an example. The inside array antenna may be disposed, for example, as an equidistant linear array.

Figure 7:
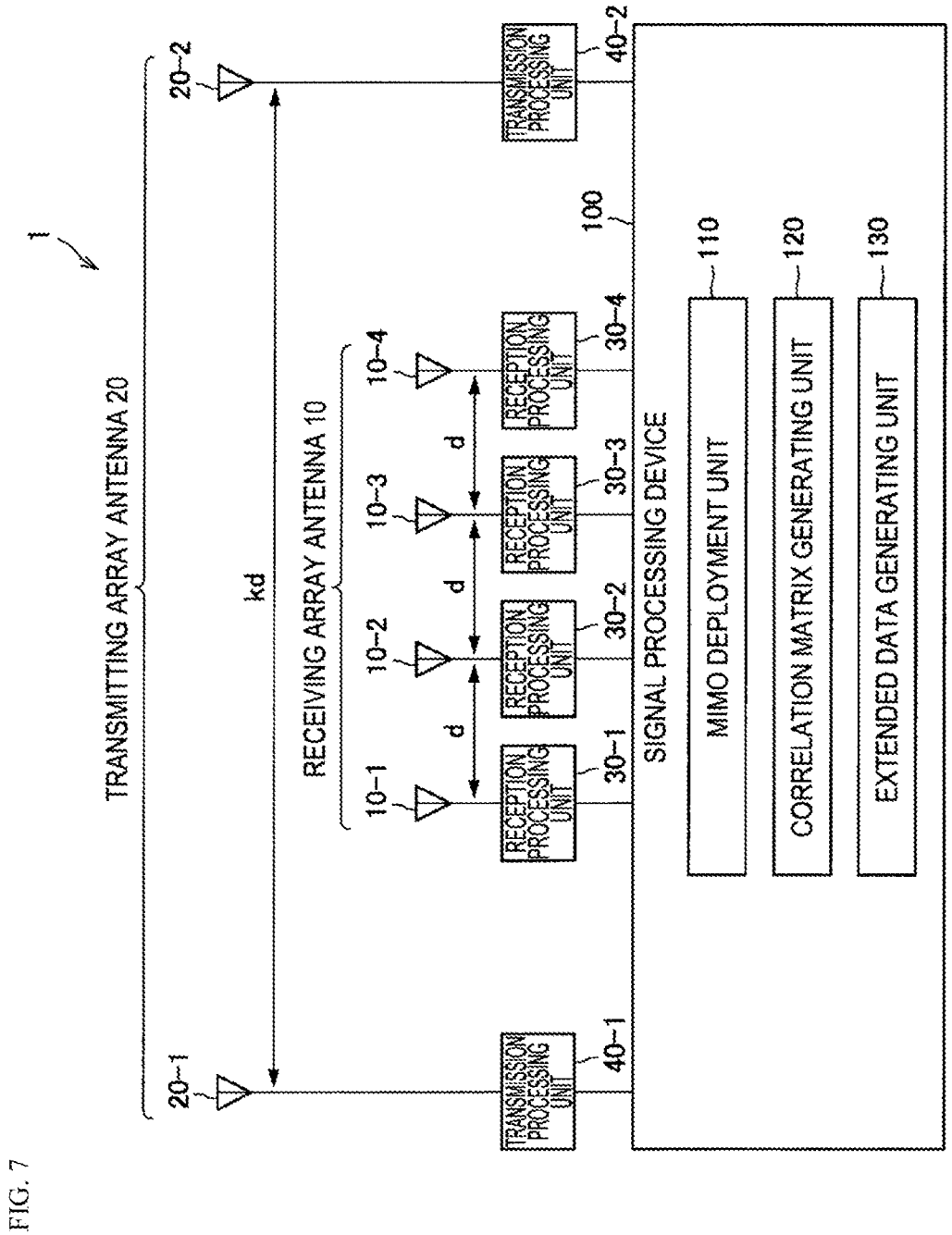
FIG. 7 is an explanatory diagram illustrating another configuration example of the MIMO radar device 1 according to an embodiment of the present disclosure.

FIG. 7 is an explanatory diagram illustrating another configuration example of the MIMO radar device 1 according to an embodiment of the present disclosure. FIG. 7 illustrates an example in which the receiving antenna elements 10-1 to 10-4 of the receiving array antenna 10 are linearly disposed at an equidistance d.

If the inside array antenna is an equidistant linear array, the coefficient k for deciding the shortest distance of the outside array antenna (the transmitting array antenna 20 in the example of FIG. 7) complies with the condition of the following expression 12. L represents the number of antenna elements of the inside equidistant linear array.

[Math. 12]

$$k \leq 2L-1 \quad \text{(expression 12)}$$

The receiving array antenna 10 of the MIMO radar device 1 illustrated in FIG. 7 includes four receiving antenna elements. Accordingly, if k is less than or equal to 7, it can be guaranteed that the mode vector $a_{EX}$ of the extended data vector is continuous.

The mode vector of the transmitting array antenna 20 of the MIMO radar device 1 illustrated in FIG. 7 is shown in the following expression 13. The mode vector of the receiving array antenna 10 is shown in the following expression 14. The mode vector of the received signal vector x subjected to MIMO deployment is shown in the following expression 15. The correlation matrix for generating the extended data vector y is shown in the following expression 16. The mode vector $a_{EX}$ of the extended data vector is shown in the following expression 17. The transformation matrix U is then a matrix having a size of 21×64 as shown in an expression 18.

[Math. 13]

$$a_{IX} = [1 \, e^{+7j\phi}]^T \quad \text{(expression 13)}$$

[Math. 14]

$$a_{RX} = [1\ e^{+1j\phi}\ e^{+2j\phi}\ e^{+3j\phi}]^T \quad \text{(expression 14)}$$

[Math. 15]

$$a_{MIMO} = a_{TX} \otimes a_{RX} = [1\ e^{+1j\phi}\ e^{+2j\phi}\ e^{+3j\phi}\ e^{+7j\phi}\ e^{+8j\phi}\ e^{+9j\phi}\ e^{+10j\phi}]^T \quad \text{(expression 15)}$$

[Math. 16]

(expression 16)

$$R_{XX} = xx^H = |s|^2 \cdot \begin{bmatrix} 1 & e^{-1j\varphi} & e^{-2j\varphi} & e^{-3j\varphi} & e^{-7j\varphi} & e^{-8j\varphi} & e^{-9j\varphi} & e^{-10j\varphi} \\ e^{+1j\varphi} & 1 & e^{-1j\varphi} & e^{-2j\varphi} & e^{-6j\varphi} & e^{-7j\varphi} & e^{+8j\varphi} & e^{-9j\varphi} \\ e^{+2j\varphi} & e^{+1j\varphi} & 1 & e^{-1j\varphi} & e^{-5j\varphi} & e^{-6j\varphi} & e^{-7j\varphi} & e^{-8j\varphi} \\ e^{+3j\varphi} & e^{+2j\varphi} & e^{+1j\varphi} & 1 & e^{-4j\varphi} & e^{-5j\varphi} & e^{-6j\varphi} & e^{-7j\varphi} \\ e^{+7j\varphi} & e^{+6j\varphi} & e^{+5j\varphi} & e^{+4j\varphi} & 1 & e^{-1j\varphi} & e^{-2j\varphi} & e^{-3j\varphi} \\ e^{+8j\varphi} & e^{+7j\varphi} & e^{+6j\varphi} & e^{+5j\varphi} & e^{+1j\varphi} & 1 & e^{-1j\varphi} & e^{-2j\varphi} \\ e^{+9j\varphi} & e^{+8j\varphi} & e^{+7j\varphi} & e^{+6j\varphi} & e^{+2j\varphi} & e^{+1j\varphi} & 1 & e^{-1j\varphi} \\ e^{+10j\varphi} & e^{+9j\varphi} & e^{+8j\varphi} & e^{+7j\varphi} & e^{+3j\varphi} & e^{+2j\varphi} & e^{+1j\varphi} & 1 \end{bmatrix}$$

[Math. 17]

$$a_{EX} = \begin{bmatrix} e^{-10j\varphi} \\ e^{-9j\varphi} \\ e^{-8j\varphi} \\ e^{-7j\varphi} \\ e^{-6j\varphi} \\ e^{-5j\varphi} \\ e^{-4j\varphi} \\ e^{-3j\varphi} \\ e^{-2j\varphi} \\ e^{-1j\varphi} \\ 1 \\ e^{+1j\varphi} \\ e^{+2j\varphi} \\ e^{+3j\varphi} \\ e^{+4j\varphi} \\ e^{+5j\varphi} \\ e^{+6j\varphi} \\ e^{+7j\varphi} \\ e^{+8j\varphi} \\ e^{+9j\varphi} \\ e^{+10j\varphi} \end{bmatrix} \quad \text{(expression 17)}$$

[Math. 18]

(expression 18)

$$U = \begin{bmatrix}
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 1/4 & 0 & 0 & 0 & 0 & 0 & 0 \\
0 & 0 & 0 & 0 & 0 & 0 & 0 & 1/6 & 0 & 0 & 0 & 0 & 0 & 0 & 0 & 1/6 & 0 & 0 & 0 & 0 & 0 & 0 \\
1/8 & 0 & 0 & 0 & 0 & 0 & 0 & 0 & 1/8 & 0 & 0 & 0 & 0 & 0 & 0 & 0 & 1/8 & 0 & 0 & 0 & 0 & 0 \\
0 & 1/5 & 0 & 0 & 0 & 0 & 0 & 0 & 0 & 1/6 & 0 & 0 & 0 & 0 & 0 & 0 & 0 & 1/5 & 0 & 0 & 0 & 0 \\
0 & 0 & 1/4 & 0 & 0 & 0 & 0 & 0 & 0 & 0 & 1/4 & 0 & 0 & 0 & 0 & 0 & 0 & 0 & 0 & 0 & 0 & 0 \\
0 & 0 & 0 & 1/2 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 1/2 & 0 & 0 \\
0 & 0 & 0 & 0 & 0 & 0 & 0 & 0 & 0 & 0 & 0 & 1/3 & 0 & 0 & 0 & 0 & 0 & 0 & 0 & 0 & 1/3 & 0 \\
0 & 0 & 0 & 0 & 1/4 & 0 & 0 & 0 & 0 & 0 & 0 & 0 & 1/4 & 0 & 0 & 0 & 0 & 0 & 0 & 0 & 0 & 0 \\
0 & 0 & 0 & 0 & 0 & 1/3 & 0 & 0 & 0 & 0 & 0 & 0 & 0 & 1/3 & 0 & 0 & 0 & 0 & 0 & 0 & 0 & 0 \\
0 & 0 & 0 & 0 & 0 & 0 & 1/2 & 0 & 0 & 0 & 0 & 0 & 0 & 0 & 1/2 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 & 0 & 0 & 0 & 0 & 0 & 0
\end{bmatrix}$$

$$\begin{bmatrix}
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 1/3 & 0 & 0 & 0 \\
0 & 0 & 0 & 0 & 0 & 0 & 0 & 0 & 0 & 1/4 & 0 & 0 & 0 & 0 & 0 & 0 & 0 & 1/4 & 0 & 0 \\
0 & 0 & 0 & 0 & 0 & 0 & 0 & 0 & 0 & 0 & 1/3 & 0 & 0 & 0 & 0 & 0 & 0 & 0 & 0 & 1/3 \\
0 & 0 & 0 & 0 & 0 & 0 & 0 & 0 & 0 & 0 & 0 & 1/2 & 0 & 0 & 0 & 0 & 0 & 0 & 0 & 0 \\
0 & 0 & 0 & 0 & 0 & 0 & 0 & 0 & 0 & 0 & 0 & 0 & 1 & 0 & 0 & 0 & 0 & 0 & 0 & 0 \\
0 & 0 & 1/2 & 0 & 0 & 0 & 0 & 0 & 0 & 0 & 0 & 0 & 0 & 0 & 0 & 0 & 0 & 0 & 0 & 0 \\
0 & 0 & 0 & 1/4 & 0 & 0 & 0 & 0 & 0 & 0 & 0 & 0 & 0 & 0 & 0 & 0 & 0 & 0 & 0 & 0 \\
0 & 0 & 0 & 0 & 1/6 & 0 & 0 & 0 & 0 & 0 & 0 & 0 & 0 & 0 & 0 & 0 & 0 & 0 & 0 & 0 \\
0 & 0 & 0 & 0 & 0 & 1/8 & 0 & 0 & 0 & 0 & 0 & 0 & 1/8 & 0 & 0 & 0 & 0 & 0 & 0 & 0 \\
0 & 0 & 0 & 0 & 0 & 0 & 0 & 0 & 0 & 0 & 0 & 0 & 0 & 1/6 & 0 & 0 & 0 & 0 & 0 & 0 \\
0 & 0 & 0 & 0 & 0 & 0 & 0 & 0 & 0 & 0 & 0 & 0 & 0 & 0 & 1/4 & 0 & 0 & 0 & 0 & 0 \\
0 & 0 & 0 & 0 & 0 & 0 & 0 & 0 & 0 & 0 & 0 & 0 & 0 & 0 & 0 & 1/2 & 0 & 0 & 0 & 0 \\
0 & 0 & 0 & 0 & 0 & 1 & 0 & 0 & 0 & 0 & 0 & 0 & 0 & 0 & 0 & 0 & 0 & 0 & 0 & 0 \\
0 & 0 & 0 & 0 & 0 & 0 & 1/2 & 0 & 0 & 0 & 0 & 0 & 0 & 0 & 0 & 0 & 0 & 0 & 0 & 0 \\
0 & 0 & 0 & 0 & 0 & 0 & 0 & 1/3 & 0 & 0 & 0 & 0 & 0 & 0 & 0 & 0 & 0 & 0 & 0 & 0 \\
1/4 & 0 & 0 & 0 & 0 & 0 & 0 & 1/4 & 0 & 0 & 0 & 0 & 0 & 0 & 0 & 0 & 0 & 0 & 0 & 0 \\
0 & 1/3 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0
\end{bmatrix}$$

$$\begin{bmatrix}
0 & 0 & 0 & 0 & 0 & 0 & 0 & 0 & 0 & 0 & 0 & 0 & 0 & 1 & 0 & 0 & 0 & 0 & 0 & 0 & 0 \\
0 & 0 & 0 & 0 & 0 & 1/2 & 0 & 0 & 0 & 0 & 0 & 0 & 0 & 0 & 1/2 & 0 & 0 & 0 & 0 & 0 & 0 \\
0 & 0 & 0 & 0 & 0 & 0 & 1/3 & 0 & 0 & 0 & 0 & 0 & 0 & 0 & 0 & 1/3 & 0 & 0 & 0 & 0 & 0 \\
0 & 0 & 0 & 0 & 0 & 0 & 0 & 1/4 & 0 & 0 & 0 & 0 & 0 & 0 & 0 & 0 & 1/4 & 0 & 0 & 0 & 0 \\
0 & 0 & 0 & 0 & 0 & 0 & 0 & 0 & 1/3 & 0 & 0 & 0 & 0 & 0 & 0 & 0 & 0 & 0 & 0 & 0 & 0 \\
1/2 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 1/2 & 0 & 0 & 0 & 0 \\
0 & 0 & 0 & 0 & 0 & 0 & 0 & 0 & 0 & 1/4 & 0 & 0 & 0 & 0 & 0 & 0 & 0 & 1/4 & 0 & 0 & 0 \\
0 & 1/5 & 0 & 0 & 0 & 0 & 0 & 0 & 0 & 0 & 1/6 & 0 & 0 & 0 & 0 & 0 & 0 & 0 & 1/5 & 0 & 0 \\
0 & 0 & 1/8 & 0 & 0 & 0 & 0 & 0 & 0 & 0 & 0 & 1/8 & 0 & 0 & 0 & 0 & 0 & 0 & 0 & 0 & 1/8 \\
0 & 0 & 0 & 1/6 & 0 & 0 & 0 & 0 & 0 & 0 & 0 & 0 & 1/5 & 0 & 0 & 0 & 0 & 0 & 0 & 0 & 0 \\
0 & 0 & 0 & 0 & 1/4 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0
\end{bmatrix}$$

The MIMO radar device 1 can also prevent increase in physical size, and generate an extended data vector equivalently to a radar device including an equidistant linear array antenna including a large number of elements. The MIMO radar device 1 illustrated in FIG. 7 can thus achieve miniaturization and concurrently high azimuth resolution.

It has been described that the MIMO radar device 1 illustrated in FIG. 1 linearly disposes the inside array antenna at distances of a perfect Golomb ruler. The present disclosure is not, however, limited to such an example. The inside array antenna may be disposed as a 2-level nested array.

Figure 8:
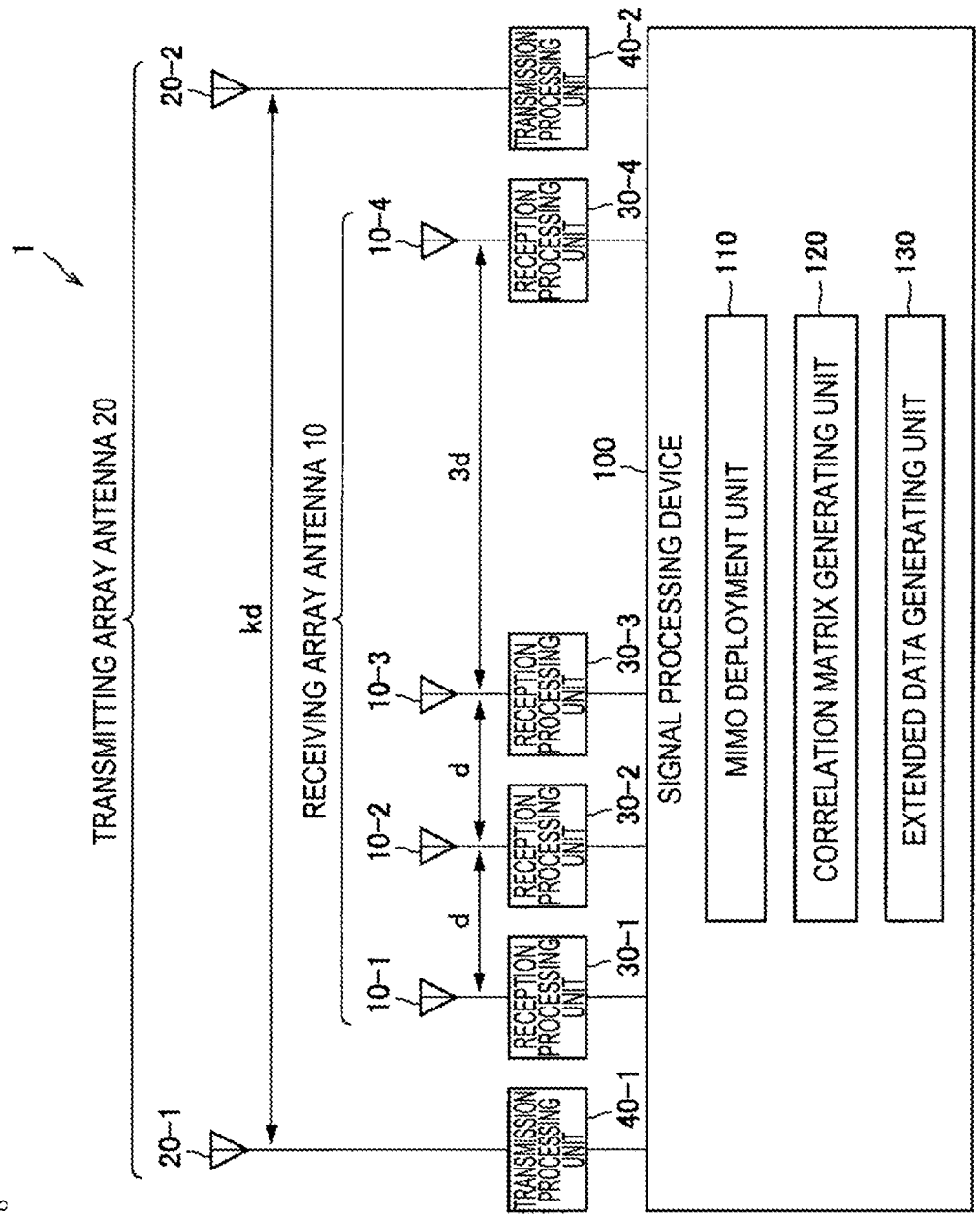
FIG. 8 is an explanatory diagram illustrating another configuration example of the MIMO radar device 1 according to an embodiment of the present disclosure.

FIG. 8 is an explanatory diagram illustrating another configuration example of the MIMO radar device 1 according to an embodiment of the present disclosure. FIG. 8 illustrates an example in which the receiving antenna elements 10-1 to 10-4 of the receiving array antenna 10 are disposed as a 2-level nested array.

Figure 9:
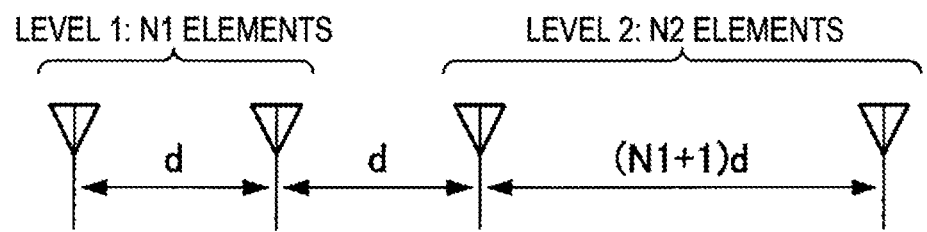
FIG. 9 is an explanatory diagram for describing a 2-level nested array.

A 2-level nested array will be described with reference to FIG. 9. A 2-level nested array is an array antenna that disposes a level-1 equidistant linear array adjacent to a level-2 equidistant linear array as illustrated in FIG. 9. The level-1 equidistant linear array has an element distance represented as d, and the number of elements is represented as N1. The level-2 equidistant linear array has an element distance represented as (N1+1)d, and the number of elements is represented as N2.

If the inside array antenna is disposed as a 2-level nested array, the coefficient k for deciding the shortest distance of the outside array antenna complies with the condition of the following expression 19.

[Math. 19]

$$k \leq \frac{L^2 - 2}{2} + L \quad \text{(expression 19)}$$

The number L of elements disposed as a 2-level nested array and included in the receiving array antenna 10 serving as the inside array antenna is equal to 4 in the case of the MIMO radar device 1 illustrated in FIG. 8. Accordingly, if k is less than or equal to 11, it can be guaranteed that the mode vector $a_{EX}$ of the extended data vector is continuous. The following describes mode vectors or the like in the case of k=8.

The mode vector of the transmitting array antenna 20 of the MIMO radar device 1 illustrated in FIG. 8 is shown in the following expression 20. The mode vector of the receiving array antenna 10 is shown in the following expression 21. The mode vector of the received signal vector x subjected to MIMO deployment is shown in the following expression 22. The correlation matrix for generating the extended data vector y is shown in the following expression 23. The mode vector $a_{EX}$ of the extended data vector is shown in the following expression 24. The transformation matrix U is then a matrix having a size of 27×64 as shown in an expression 25.

[Math. 20]

$$a_{TX} = [1 e^{+8j\phi}]^T \quad \text{(expression 20)}$$

[Math. 21]

$$a_{RX} = [1 e^{+1j\phi} e^{+2j\phi} e^{+5j\phi}]^T \quad \text{(expression 21)}$$

[Math. 22]

$$a_{MIMO} = a_{TX} \otimes a_{RX} = [1 e^{+1j\phi} e^{+2j\phi} e^{+5j\phi} e^{+8j\phi} e^{+9j\phi} e^{+10j\phi} e^{+13j\phi}]^T \quad \text{(expression 22)}$$

[Math. 23]

$$R_{XX} = xx^H = |s|^2 \cdot \begin{bmatrix} 1 & e^{-1j\varphi} & e^{-2j\varphi} & e^{-5j\varphi} & e^{-8j\varphi} & e^{+9j\varphi} & e^{-10j\varphi} & e^{-13j\varphi} \\ e^{+1j\varphi} & 1 & e^{-1j\varphi} & e^{-4j\varphi} & e^{-7j\varphi} & e^{-8j\varphi} & e^{+4j\varphi} & e^{-12j\varphi} \\ e^{+2j\varphi} & e^{+1j\varphi} & 1 & e^{-3j\varphi} & e^{-6j\varphi} & e^{-7j\varphi} & e^{-8j\varphi} & e^{-11j\varphi} \\ e^{+5j\varphi} & e^{+4j\varphi} & e^{+3j\varphi} & 1 & e^{-3j\varphi} & e^{-4j\varphi} & e^{-5j\varphi} & e^{-8j\varphi} \\ e^{+8j\varphi} & e^{+7j\varphi} & e^{+6j\varphi} & e^{+3j\varphi} & 1 & e^{-1j\varphi} & e^{-2j\varphi} & e^{-5j\varphi} \\ e^{+9j\varphi} & e^{+8j\varphi} & e^{+7j\varphi} & e^{+4j\varphi} & e^{+1j\varphi} & 1 & e^{-1j\varphi} & e^{-4j\varphi} \\ e^{+10j\varphi} & e^{+9j\varphi} & e^{+8j\varphi} & e^{+5j\varphi} & e^{+2j\varphi} & e^{+1j\varphi} & 1 & e^{-3j\varphi} \\ e^{+13j\varphi} & e^{+12j\varphi} & e^{+11j\varphi} & e^{+8j\varphi} & e^{+5j\varphi} & e^{+4j\varphi} & e^{+3j\varphi} & 1 \end{bmatrix} \quad \text{(expression 23)}$$

[Math. 24]

$$a_{EX} = \begin{bmatrix} e^{-13j\varphi} \\ e^{-12j\varphi} \\ e^{-11j\varphi} \\ e^{-10j\varphi} \\ e^{-9j\varphi} \\ e^{-8j\varphi} \\ e^{-7j\varphi} \\ e^{-6j\varphi} \\ e^{-5j\varphi} \\ e^{-4j\varphi} \\ e^{-3j\varphi} \\ e^{-2j\varphi} \\ e^{-1j\varphi} \\ 1 \\ e^{+1j\varphi} \\ e^{+2j\varphi} \\ e^{+3j\varphi} \\ e^{+4j\varphi} \\ e^{+5j\varphi} \\ e^{+6j\varphi} \\ e^{+7j\varphi} \\ e^{+8j\varphi} \\ e^{+9j\varphi} \\ e^{+10j\varphi} \\ e^{+11j\varphi} \\ e^{+12j\varphi} \\ e^{+13j\varphi} \end{bmatrix} \quad \text{(expression 24)}$$

[Math. 25]

(expression 25)

$$U = \begin{bmatrix}
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 1/2 & 0 & 0 & 0 & 0 & 0 & 0 \\
0 & 0 & 0 & 0 & 0 & 0 & 0 & 1/4 & 0 & 0 & 0 & 0 & 0 & 0 & 0 & 0 & 1/4 & 0 & 0 & 0 & 0 & 0 \\
1/8 & 0 & 0 & 0 & 0 & 0 & 0 & 0 & 1/8 & 0 & 0 & 0 & 0 & 0 & 0 & 0 & 1/8 & 0 & 0 & 0 & 0 & 0 \\
0 & 1/4 & 0 & 0 & 0 & 0 & 0 & 0 & 0 & 1/4 & 0 & 0 & 0 & 0 & 0 & 0 & 0 & 0 & 0 & 0 & 0 & 0 \\
0 & 0 & 1/2 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 1/3 & 0 & 0 & 0 \\
0 & 0 & 0 & 0 & 0 & 0 & 0 & 0 & 0 & 0 & 1/3 & 0 & 0 & 0 & 0 & 0 & 0 & 0 & 0 & 0 & 0 & 0 \\
0 & 0 & 0 & 1/3 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 1 & 0 \\
0 & 0 & 0 & 0 & 0 & 0 & 0 & 0 & 0 & 0 & 0 & 1/2 & 0 & 0 & 0 & 0 & 0 & 0 & 0 & 0 & 0 & 1/2 \\
0 & 0 & 0 & 0 & 1/4 & 0 & 0 & 0 & 0 & 0 & 0 & 0 & 1/4 & 0 & 0 & 0 & 0 & 0 & 0 & 0 & 0 & 0 \\
0 & 0 & 0 & 0 & 0 & 1/2 & 0 & 0 & 0 & 0 & 0 & 0 & 0 & 1/2 & 0 & 0 & 0 & 0 & 0 & 0 & 0 & 0 \\
0 & 0 & 0 & 0 & 0 & 0 & 1 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 1 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 & 0 & 0 & 0 & 0 & 0 & 0 \\
\end{bmatrix}$$

```
0    0   0   0   0   0    0   0   0   0   0    0    0   0   0    0    0    0    0    0    0
0    0   0   0   0   0    0   0   0   0   0    0    0   0   0    0    0    0    0    0    0
0    0   0   0   0   0    0   0   0   0   0    0    0   0   0    0    0    0    0    0    0
0    0   0   0   0   0    0   0   0   0   0    0    0   0   0    0    0    0    0    0    0
0    0   0   0   0   0    0   0   0   0   0    0    0   0   0    0    0    1/2  0    0    0
0    0   0   0   0   0    0   0   0   0   1/4  0    0   0   0    0    0    0    0    1/4  0
0    0   0   0   0   0    0   0   0   0   0    1/2  0   0   0    0    0    0    0    0    1/2
0    0   0   0   0   0    0   0   0   0   0    0    1   0   0    0    0    0    0    0    0
0    0   1/3 0   0   0    0   0   0   0   0    0    0   0   0    0    0    0    0    0    0
0    0   0   1/3 0   0    0   0   0   0   0    0    0   0   0    0    0    0    0    0    0
0    0   0   0   1/3 0    0   0   0   0   0    0    1/3 0   0    0    0    0    0    0    0
0    0   0   0   0   0    0   0   0   0   0    0    0   0   0    0    0    0    0    0    0
0    0   0   0   0   0    0   0   0   0   0    0    0   0   0    0    0    0    0    0    0
0    0   0   0   0   1/8  0   0   0   0   0    0    0   1/8 0    0    0    0    0    0    0
0    0   0   0   0   0    0   0   0   0   0    0    0   0   1/4  0    0    0    0    0    0
0    0   0   0   0   0    0   0   0   0   0    0    0   0   0    1/2  0    0    0    0    0
0    0   0   0   0   0    1/3 0   0   0   0    0    0   0   0    0    0    0    0    0    0
0    0   0   0   0   0    0   1/3 0   0   0    0    0   0   0    0    0    0    0    0    0
0    0   0   0   0   0    0   0   1/3 0   0    0    0   0   0    0    1/3  0    0    0    0
0    0   0   0   0   0    0   0   0   0   0    0    0   0   0    0    0    0    0    0    0
0    0   0   0   0   0    0   0   0   0   0    0    0   0   0    0    0    0    0    0    0
1/4  0   0   0   0   0    0   0   1/4 0   0    0    0   0   0    0    0    0    0    0    0
0    0   0   0   0   0    0   0   0   0   0    0    0   0   0    0    0    0    0    0    0
0    0   0   0   0   0    0   0   0   0   0    0    0   0   0    0    0    0    0    0    0
0    1   0   0   0   0    0   0   0   0   0    0    0   0   0    0    0    0    0    0    0
0    0   0   0   0   0    0   0   0   0   0    0    0   0   0    0    0    0    0    0    0
0    0   0   0   0   0    0   0   0   0   0    0    0   0   0    0    0    0    0    0    0
```

-continued $$\begin{bmatrix}
0 & 0 & 0 & 0 & 0 & 0 & 0 & 0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 & 0 & 0 & 1 & 0 & 0 & 0 & 0 & 0 \\
0 & 0 & 0 & 0 & 0 & 0 & 0 & 0 & 0 & 0 & 0 & 0 & 0 & 0 & 0 & 1 & 0 & 0 & 0 & 0 \\
0 & 0 & 0 & 0 & 0 & 1 & 0 & 0 & 0 & 0 & 0 & 0 & 0 & 0 & 0 & 0 & 0 & 0 & 0 & 0 \\
0 & 0 & 0 & 0 & 0 & 0 & 1/2 & 0 & 0 & 0 & 0 & 0 & 0 & 0 & 0 & 0 & 0 & 0 & 0 & 0 \\
0 & 0 & 0 & 0 & 0 & 0 & 0 & 1/4 & 0 & 0 & 0 & 0 & 0 & 0 & 0 & 0 & 1/4 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 1/3 & 0 & 0 & 0 & 0 & 0 & 0 & 0 & 1/3 & 0 & 0 & 0 \\
1/3 & 0 & 0 & 0 & 0 & 0 & 0 & 0 & 0 & 0 & 0 & 0 & 0 & 0 & 0 & 0 & 0 & 1/3 & 0 & 0 \\
0 & 0 & 0 & 0 & 0 & 0 & 0 & 0 & 0 & 0 & 0 & 0 & 0 & 0 & 0 & 0 & 0 & 0 & 1/3 & 0 \\
0 & 0 & 0 & 0 & 0 & 0 & 0 & 0 & 0 & 1/2 & 0 & 0 & 0 & 0 & 0 & 0 & 0 & 0 & 0 & 0 \\
0 & 1/4 & 0 & 0 & 0 & 0 & 0 & 0 & 0 & 0 & 1/4 & 0 & 0 & 0 & 0 & 0 & 0 & 0 & 0 & 0 \\
0 & 0 & 1/8 & 0 & 0 & 0 & 0 & 0 & 0 & 0 & 0 & 1/8 & 0 & 0 & 0 & 0 & 0 & 0 & 0 & 1/8 \\
0 & 0 & 0 & 1/4 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 1/3 & 0 & 0 & 0 & 0 & 0 & 0 & 0 & 0 \\
0 & 0 & 0 & 0 & 1/3 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 & 0 & 0 & 0 & 0
\end{bmatrix}$$

The MIMO radar device 1 illustrated in FIG. 8 can also prevent increase in physical size, and generate an extended data vector equivalently to a radar device including an equidistant linear array antenna including a large number of elements. The MIMO radar device 1 illustrated in FIG. 8 can thus achieve miniaturization and concurrently high azimuth resolution.

The above-described MIMO radar device 1 is configured to dispose the transmitting array antenna 20 outside the receiving array antenna 10 in any case. The present disclosure is not, however, limited to such an example. The MIMO radar device 1 may be configured to dispose the transmitting array antenna 20 inside the receiving array antenna 10.

Figure 10:
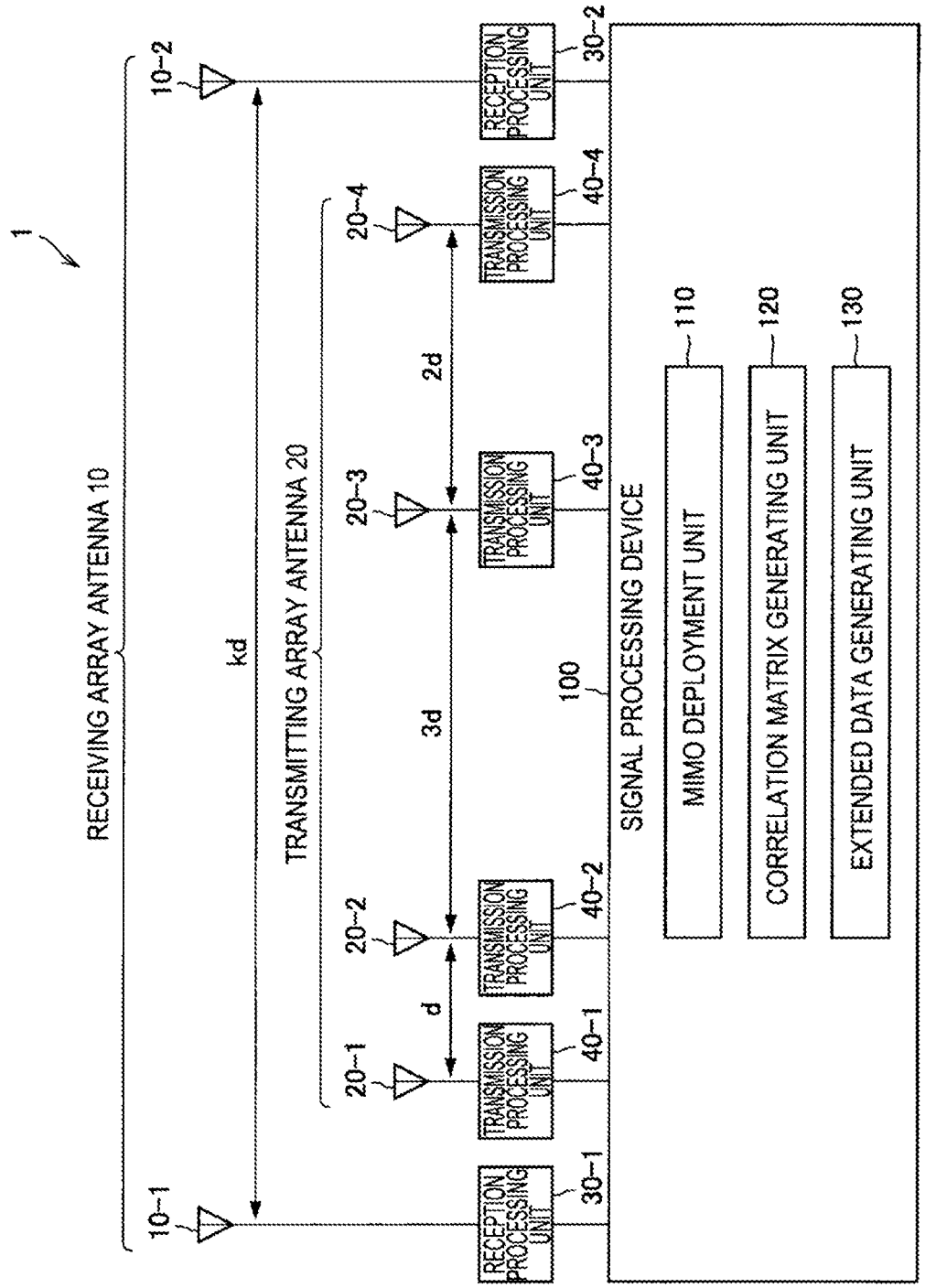
FIG. 10 is an explanatory diagram illustrating another configuration example of the MIMO radar device 1 according to an embodiment of the present disclosure.

FIG. 10 is an explanatory diagram illustrating another configuration example of the MIMO radar device 1 according to an embodiment of the present disclosure. FIG. illustrate's a configuration example in which the position of the receiving array antenna 10 is exchanged with the position of the transmitting array antenna 20 in the configuration illustrated in FIG. 1, and the transmitting array antenna 20 is disposed inside the receiving array antenna 10. The transmitting array antenna 20 has the transmitting antenna elements 20-1 to 20-4 disposed at positions of a perfect Golomb ruler of order 4.

Even if the position of the receiving array antenna 10 is exchanged with the position of the transmitting array antenna 20 in this way, the MIMO radar device 1 illustrated in FIG. 10 can prevent increase in physical size, and generate an extended data vector equivalently to a radar device including an equidistant linear array antenna including a large number of elements. The MIMO radar device 1 illustrated in FIG. can thus achieve miniaturization and concurrently high azimuth resolution.

The MIMO radar device 1 according to an embodiment of the present disclosure can achieve miniaturization and concurrently high azimuth resolution. The MIMO radar device 1 according to an embodiment of the present disclosure can be thus suitably applied to a radar device that has to address these high-level requests in a system which assists an automobile in safe driving.

Figure 11:
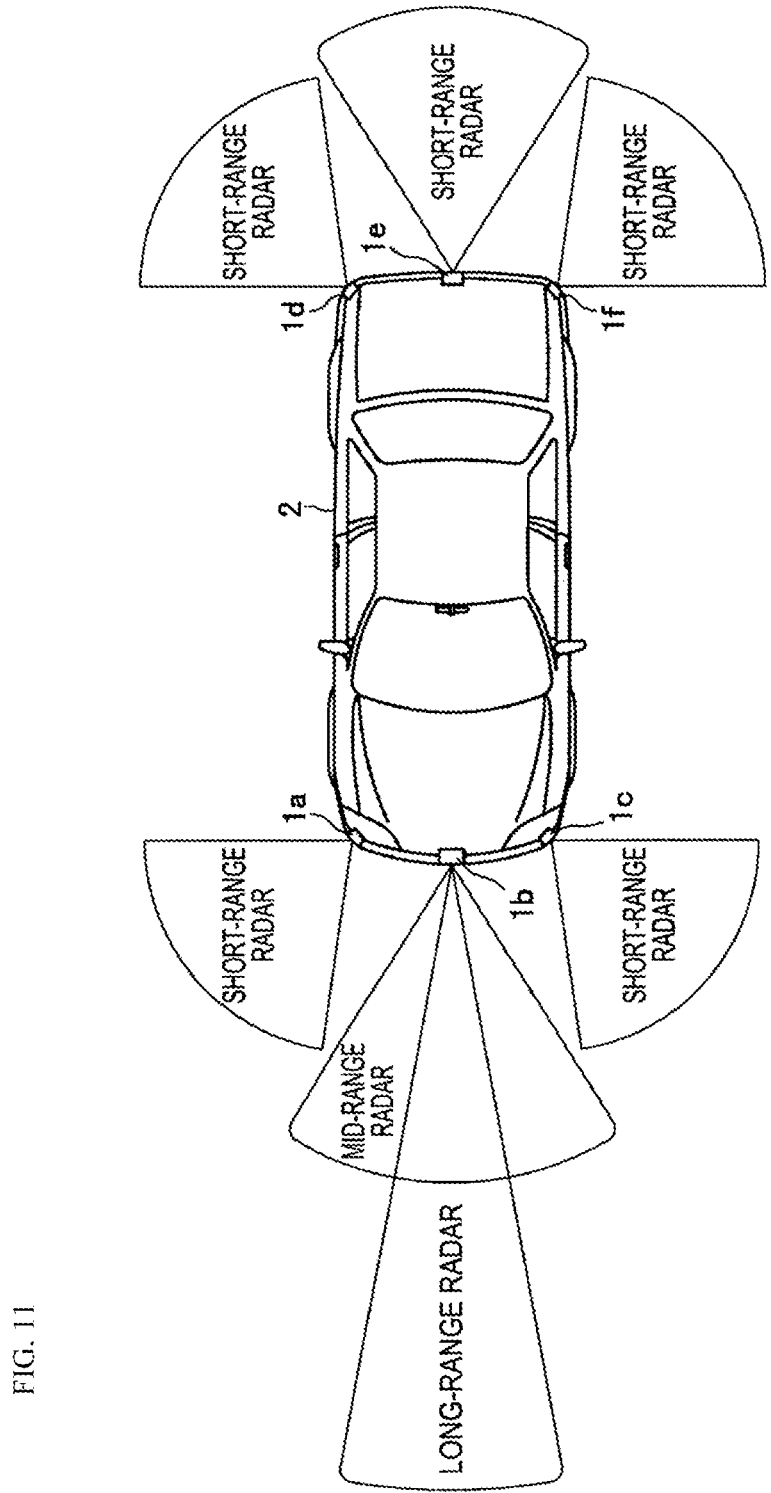
FIG. 11 is an explanatory diagram illustrating an example in which a MIMO radar device is installed in a vehicle.

FIG. 11 is an explanatory diagram illustrating an example in which MIMO radar devices 1a to 1f are installed in a vehicle 2. The MIMO radar devices 1a to 1f illustrated in FIG. 11 are assumed to be any of the MIMO radar devices 1 according to the above-described embodiment of the present disclosure. The MIMO radar devices 1a to 1f are radar devices for any of short, middle, and long distances, and used to detect an object or the like around the vehicle 2.

The application of the MIMO radar device 1 according to an embodiment of the present disclosure as this radar device of the system that assists an automobile in safe driving contributes to allowing the system to achieve miniaturization and higher performance.

2. Conclusion

According to an embodiment of the present disclosure as described above, there is provided a MIMO radar device including a first array antenna including a plurality of antenna elements and having the antenna elements disposed under predetermined rules such as a perfect Golomb ruler, an equidistance, and a 2-level nested array, and a second array antenna including a plurality of antenna elements and having at least two of the plurality of antenna elements provided across the first array antenna.

The MIMO radar device according to an embodiment of the present disclosure includes the above-described two array antennas, and can thus prevent increase in physical size and generate an extended data vector equivalently to a radar device including an equidistant linear array antenna including a large number of elements. The MIMO radar device according to an embodiment of the present disclosure can thus achieve miniaturization and concurrently high azimuth resolution.

The respective steps in the processing executed by each device described herein do not necessarily have to be performed chronologically in the order described in a sequence diagram or a flowchart. For example, the respective steps in the processing executed by each device may be performed in order different from the order described in the flowcharts, or may be performed in parallel.

It is also possible to fabricate a computer program for causing hardware such as the CPU, ROM, and RAM built in each device to implement the same functions as those of the structural elements of each device. It is also possible to provide a storage medium having the computer program stored therein. The respective functional blocks described in the functional block diagram are configured with hardware or a hardware circuit, thereby allowing the series of processing to be implemented by the hardware or the hardware circuit.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A MIMO radar device including:
a first array antenna configured to have L (L≥2) antenna elements disposed in one direction under a first rule; and
a second array antenna configured to have M (M s 2) antenna elements disposed in a same direction as the one direction of the first array antenna under a second rule, and to have at least two of the M antenna elements provided across the first array antenna.

(2)
The MIMO radar device according to (1), wherein the first rule is to dispose the L antenna elements in accordance with positions of a perfect Golomb ruler.

(3)
The MIMO radar device according to (1), wherein the first rule is to dispose the L antenna elements in accordance with a 2-level nested array.

(4)
The MIMO radar device according to (1), wherein the first rule is to equidistantly dispose the L antenna elements.

(5)
The MIMO radar device according to any one of (1) to (4), wherein
the second rule is to provide an upper limit to a distance between the antenna elements provided across the first array antenna.

(6)
The MIMO radar device according to (5), wherein
the upper limit is an upper limit for making a case of arrangement under the first rule or the second rule equivalent to a case in which the first array antenna or the second array antenna is provided with equidistant antenna elements.

(7)
The MIMO radar device according to any one of (1) to (6), wherein
one of the first array antenna and the second array antenna transmits a radar signal, and the other receives a radar echo signal.

(8)
The MIMO radar device according to (7), further including:
a signal processing unit configured to perform signal processing on the received radar echo signal.

(9)
The MIMO radar device according to (8), wherein
the signal processing unit includes
a deployment unit configured to generate L×M received signal vectors subjected to MIMO deployment, from the radar echo signal,
a correlation matrix generating unit configured to generate a correlation matrix having L×M rows and L×M columns from the received signal vectors generated by the deployment unit, and
an extended data generating unit configured to map an element of the correlation matrix to an extended data vector.

(10)
A MIMO radar device including:
a signal processing device including, on one side, antenna terminals of L (L≥2) antenna elements included in a first array antenna, and, on both sides orthogonal to the one side, antenna terminals of M (M≥2) antenna elements included in a second array antenna.

(11)
A vehicle including:
the MIMO radar device according to any one of (1) to (10).

(12)
A MIMO radar device comprising:
a first array antenna, wherein the first array antenna includes L (L≥2) antenna elements disposed in one direction under a first rule; and
a second array antenna, wherein the second array antenna includes M (M≥2) antenna elements disposed in a same direction as the one direction of the first array antenna under a second rule, and wherein at least two of the M antenna elements of the second array antenna are outside of the first array antenna.

(13)
The MIMO radar device according to (12), wherein
the first rule is to dispose the L antenna elements of the first array antenna in accordance with positions of a perfect Golomb ruler.

(14)
The MIMO radar device according to (12), wherein
the first rule is to dispose the L antenna elements of the first array antenna in accordance with a 2-level nested array.

(15)

The MIMO radar device according to (12), wherein
the first rule is to equidistantly dispose the L antenna elements of the first array antenna.

(16)

The MIMO radar device according to any one of (12) to (15), wherein
the second rule is to provide an upper limit to a distance between the at least two antenna elements of the second array antenna.

(17)

The MIMO radar device according to (16), wherein
the upper limit is an upper limit for making a case of arrangement under the first rule or the second rule equivalent to a case in which the first array antenna or the second array antenna is provided with equidistant antenna elements.

(18)

The MIMO radar device according to any one of (12) to (17), wherein
one of the first array antenna and the second array antenna transmits a radar signal, and the other receives a radar echo signal.

(19)

The MIMO radar device according to (18), further comprising:
a signal processing unit configured to perform signal processing on the received radar echo signal.

(20)

The MIMO radar device according to (19), wherein
the signal processing unit includes:
a deployment unit configured to generate L×M received signal vectors subjected to MIMO deployment, from the radar echo signal;
a correlation matrix generating unit configured to generate a correlation matrix having L×M rows and L×M columns from the received signal vectors generated by the deployment unit; and
an extended data generating unit configured to map an element of the correlation matrix to an extended data vector.

(21)

The MIMO radar device according to (12), wherein the first array antenna includes at least first, second, and third antenna elements, wherein the first antenna element is separated from the second antenna element by a distance $d$, wherein the second antenna element is separated from the third antenna element by a distance $2d$, and wherein the first array antenna element is separated from the third array antenna element by a distance $3d$.

(22)

The MIMO radar device according to (12), wherein the first array antenna includes at least first, second, third, and fourth antenna elements, wherein the first antenna element is separated from the second antenna element by a distance $d$, wherein the second antenna element is separated from the third antenna element by a distance $3d$, wherein the third antenna element is separated from the fourth antenna element by a distance $2d$, wherein the first array antenna element is separated from the third array antenna element by a distance $4d$, wherein the second array antenna element is separated from the fourth antenna element by a distance $5d$, and wherein the first antenna element is separated from the fourth antenna element by a distance $6d$.

(23)

The MIMO radar device according to any one of (12) to (22), wherein the first and second arrays are linear arrays.

(24)

The MIMO radar device of (12), wherein the first array antenna includes at least first, second, and third antenna elements, wherein the first antenna element is separated from the second antenna element by a distance $d$, wherein the second antenna element is separated from the third antenna element by a distance $2d$, and wherein the first array antenna element is separated from the third array antenna element by a distance $3d$,
wherein the second array antenna includes at least first, second, and third antenna elements, wherein the first and second antenna elements of the second array antenna are on a first side of the elements of the first array antenna, and wherein the third antenna element of the second array antenna is on a second side of the elements of the first array antenna.

(25)

A MIMO radar device comprising:
a signal processing device including, on one side, antenna terminals of L (L≥2) antenna elements included in a first array antenna, and, on both sides orthogonal to the one side, antenna terminals of M (M≥2) antenna elements included in a second array antenna.

(26)

A vehicle comprising:
a radar device, including:
a plurality of receiving antenna elements, wherein the receiving antenna elements are arranged in a first linear array, wherein the plurality of receiving antenna elements includes at least a first receiving antenna element and a second receiving antenna element, wherein the first receiving antenna element is spaced apart from the second receiving antenna element by a distance d;
a plurality of transmitting antenna elements, wherein the transmitting antenna elements are arranged in a second linear array, wherein the plurality of transmitting antenna elements includes at least a first transmitting antenna element and a second transmitting antenna element; wherein the first transmitting antenna element is spaced apart from the second receiving antenna element by a distance kd, and wherein the first and second receiving antenna elements are between the first and second transmitting antenna elements.

(27)

An antenna system, comprising:
a plurality of receiving antenna elements, wherein the receiving antenna elements are arranged in a first linear array, wherein the plurality of receiving antenna elements includes at least a first receiving antenna element and a second receiving antenna element, wherein the first receiving antenna element is spaced apart from the second receiving antenna element by a distance d;
a plurality of transmitting antenna elements, wherein the transmitting antenna elements are arranged in a second linear array, wherein the plurality of transmitting antenna elements includes at least a first transmitting antenna element and a second transmitting antenna element; wherein the first transmitting antenna element is spaced apart from the second transmitting antenna element by a distance kd, and wherein the first and second receiving antenna elements are between the first and second transmitting antenna elements.

(28)

The antenna system of (27), wherein the plurality of receiving antenna elements additionally includes at least a third receiving antenna element, and wherein the receiving antenna elements are arranged at intervals corresponding to the intervals of a Golomb ruler.

(29)

The antenna system of (28), wherein the second receiving antenna element is separated from the third receiving antenna element by a distance $2d$, and wherein the first receiving antenna element is separated from the third receiving antenna element by a distance $3d$.

(30)

The antenna system of (27), wherein the plurality of receiving antenna elements additionally-includes at least third and fourth receiving antenna elements, and wherein the receiving antenna elements are arranged at intervals corresponding to the intervals of a Golomb ruler.

(31)

The antenna system of (30), wherein the second receiving antenna element is separated from the third receiving antenna element by a distance $3d$, wherein the third receiving antenna element is separated from the fourth receiving antenna element by a distance $2d$, wherein the first receiving antenna element is separated from the third receiving antenna element by a distance $4d$, wherein the second receiving antenna element is separated from the fourth receiving antenna element by a distance $5d$, and wherein the first receiving antenna element is separated from the fourth receiving antenna element by a distance $6d$.

REFERENCE SIGNS LIST

1 MIMO radar device
10 receiving array antenna
20 transmitting array antenna

What is claimed is:

1. A MIMO radar device comprising:
   a first array antenna, wherein the first array antenna includes L (L≥2) antenna elements disposed in one direction under a first rule; and
   a second array antenna, wherein the second array antenna includes M (M≥2) antenna elements disposed in a same direction as the one direction of the first array antenna under a second rule, and wherein at least two of the M antenna elements of the second array antenna are outside of the first array antenna,
   wherein the first array antenna includes at least first, second, and third antenna elements, wherein the first antenna element of the first array antenna is separated from the second antenna element of the first array antenna by a distance d, wherein the second antenna element of the first array antenna is separated from the third antenna element of the first array antenna by a distance $2d$, and wherein the first array antenna element of the first array antenna is separated from the third array antenna element by a distance $3d$,
   wherein the second array antenna includes at least first, second, and third antenna elements, wherein the first and second antenna elements of the second array antenna are on a first side of the elements of the first array antenna, and wherein the third antenna element of the second array antenna is on a second side of the elements of the first array antenna.

2. The MIMO radar device according to claim 1, wherein the first rule is to dispose the L antenna elements of the first array antenna in accordance with positions of a perfect Golomb ruler.

3. The MIMO radar device according to claim 1, wherein the first rule is to dispose the L antenna elements of the first array antenna in accordance with a 2-level nested array.

4. The MIMO radar device according to claim 1, wherein the second rule is to provide an upper limit to a distance between the at least two antenna elements of the second array antenna.

5. The MIMO radar device according to claim 4, wherein the upper limit is an upper limit for making a case of arrangement under the first rule or the second rule equivalent to a case in which the first array antenna or the second array antenna is provided with equidistant antenna elements.

6. The MIMO radar device according to claim 1, wherein one of the first array antenna and the second array antenna transmits a radar signal, and the other receives a radar echo signal.

7. The MIMO radar device according to claim 6, further comprising:
   a signal processing unit configured to perform signal processing on the received radar echo signal.

8. The MIMO radar device according to claim 7, wherein the signal processing unit includes:
   a deployment unit configured to generate L×M received signal vectors subjected to MIMO deployment, from the radar echo signal;
   a correlation matrix generating unit configured to generate a correlation matrix having L×M rows and L×M columns from the received signal vectors generated by the deployment unit; and
   an extended data generating unit configured to map an element of the correlation matrix to an extended data vector.

9. The MIMO radar device according to claim 1, wherein the first and second arrays are linear arrays.

10. A vehicle comprising:
    a radar device, including:
    a plurality of receiving antenna elements, wherein the receiving antenna elements are arranged in a first linear array, wherein the plurality of receiving antenna elements includes at least a first receiving antenna element, a second receiving antenna element, and a third receiving antenna element, wherein the first receiving antenna element is spaced apart from the second receiving antenna element by a distance d, wherein the second receiving antenna element is separated from the third receiving antenna element by a distance $2d$, and wherein the first receiving antenna element is separated from the third receiving antenna element by a distance $3d$; and
    a plurality of transmitting antenna elements, wherein the transmitting antenna elements are arranged in a second linear array, wherein the plurality of transmitting antenna elements includes at least a first transmitting antenna element, a second transmitting antenna element, and a third transmitting antenna element, wherein the first and second transmitting antenna elements are on a first side of the elements of the receiving antenna elements, and wherein the third transmitting antenna element is on a second side of the receiving antenna elements.

11. An antenna system, comprising:
    a plurality of receiving antenna elements, wherein the receiving antenna elements are arranged in a first linear array, wherein the plurality of receiving antenna elements includes at least a first receiving antenna element, a second receiving antenna element, and a third receiving antenna element, wherein the first receiving antenna element is spaced apart from the second receiving antenna element by a distance d, wherein the second receiving antenna element is separated from the third receiving antenna element by a distance 2*d*, and wherein the first receiving antenna element is separated from the third receiving antenna element by a distance 3*d*; and a plurality of transmitting antenna elements, wherein the transmitting antenna elements are arranged in a second linear array, wherein the plurality of transmitting antenna elements includes at least a first transmitting antenna element, a second transmitting antenna element, and a third transmitting antenna element, wherein the first transmitting antenna element is spaced apart from the second transmitting antenna element by a distance kd, wherein the first transmitting antenna element and the second transmitting antenna element are on a first side of the receiving antenna elements, and wherein the third transmitting antenna element is on a second side of the receiving antenna elements.

12. The antenna system of claim 11, wherein the receiving antenna elements are arranged at intervals corresponding to the intervals of a Golomb ruler.

13. The antenna system of claim 11, wherein the plurality of receiving antenna elements additionally includes a fourth receiving antenna element, and wherein the receiving antenna elements are arranged at intervals corresponding to the intervals of a Golomb ruler.

* * * * *